US012346795B2

(12) United States Patent
Saifullah et al.

(10) Patent No.: US 12,346,795 B2
(45) Date of Patent: Jul. 1, 2025

(54) APPARATUS AND METHOD FOR IMPROVED INSPECTION AND/OR MAINTENANCE MANAGEMENT

(71) Applicant: The Penn State Research Foundation, University Park, PA (US)

(72) Inventors: Mohammad Saifullah, University Park, PA (US); Konstantinos Papakonstantinou, University Park, PA (US); Charalampos Andriotis, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 18/853,426

(22) PCT Filed: May 12, 2023

(86) PCT No.: PCT/US2023/021992
§ 371 (c)(1),
(2) Date: Oct. 2, 2024

(87) PCT Pub. No.: WO2023/235136
PCT Pub. Date: Dec. 7, 2023

(65) Prior Publication Data
US 2025/0111207 A1    Apr. 3, 2025

Related U.S. Application Data

(60) Provisional application No. 63/347,192, filed on May 31, 2022.

(51) Int. Cl.
*G06N 3/04* (2023.01)
*G06N 3/047* (2023.01)
*G06Q 10/20* (2023.01)

(52) U.S. Cl.
CPC ............. *G06N 3/047* (2023.01); *G06Q 10/20* (2013.01)

(58) Field of Classification Search
None
See application file for complete search history.

(56) References Cited

FOREIGN PATENT DOCUMENTS

WO      2021105246 A1    6/2021

OTHER PUBLICATIONS

Andriotis et al (Deep reinforcement learning driven inspection and maintenance planning under incomplete information and constraints 2021) (Year: 2021).*
Xu et al ("Doubly Robust Off-Policy Actor-Critic: Convergence and Optimality" 2022) (Year: 2022).*

(Continued)

*Primary Examiner* — Lut Wong
(74) *Attorney, Agent, or Firm* — Buchanan Ingersoll & Rooney PC

(57) ABSTRACT

A communication system, a computer device, as well as a computer program encoded on a non-transitory computer storage medium can be configured to facilitate generation of output and/or one or more graphical user interface displays to provide improved asset maintenance management. Embodiments can be configured to generate a maintenance management process as output, including scheduling inspection and maintenance to be performed to provide significant cost and efficiency improvements.

20 Claims, 13 Drawing Sheets

(56) References Cited

OTHER PUBLICATIONS

Chen et al ("Adaptive Advantage Estimation for Actor-Critic Algorithms" 2021) (Year: 2021).*
International Search Report for PCT/US2023/021992 dated Sep. 22, 2023.
Written Opinion of the International Searching Authority for PCT/US2023/021992 dated Sep. 22, 2023.
Adrian Chow, "Solving Continuous Control using Deep Reinforcement Learning (Policy-Based Methods)" Jan. 9, 2021, pp. 1-12, retrieved Oct. 1, 2024.
Morato, et al., "Optimal inspection and maintenance planning for deteriorating structural components through dynamic Bayesian networks and Markov decision processes" Structural Safety 94 (2022) 102140, journal homepage: www.elsevier.com/locate/strusafe; https://doi.org/10.1016/j.strusafe.2021.102140; Available online Oct. 30, 2021.
Leite, et al., "Reinforcement learning beyond the Bellman equation: Exploring critic objectives using evolution" pp. 441-449, retrieved Oct. 1, 2024.
Andriotis, et al., "Deep reinforcement learning driven inspection and maintenance planning under incomplete information and constraints" Reliability Engineering and System Safety 212 (2021) 107551, journal homepage: www.elsevier.com/locate/ress, https://doi.org/10.1016/j.ress.2021.107551, Available online Mar. 11, 2021.

\* cited by examiner

APPARATUS AND METHOD FOR IMPROVED INSPECTION AND/OR MAINTENANCE MANAGEMENT

CROSS-REFERENCE TO RELATED APPLICATIONS

This application is the U.S. national stage application of International Patent Application No. PCT/US2023/021992, which claims priority to U.S. Provisional Patent Application No. 63/347,192, filed on May 31, 2022. The entirety of this application is incorporated by reference herein.

STATEMENT REGARDING FEDERALLY SPONSORED RESEARCH

This invention was made with government support Grant No. CMMI1751941 awarded by the National Science Foundation and under Grant No. 69A3551847103 awarded by the U.S. Department of Transportation. The Government has certain rights in the invention.

FIELD

The present innovation relates to apparatuses and methods that can help improve multi-asset inspection and maintenance management planning. Embodiments can be structured as a computer program encoded on a non-transitory computer storage medium that can define at least one deep reinforcement learning algorithm, which can be run by at least one processor of a computer system to help in selecting improved inspection and maintenance planning actions by interacting with a pre-defined infrastructure environment model while also allowing for adaptive actions and state/model updates. Other embodiments include communication systems or computer devices that can provide graphical user interfaces and other output to help schedule maintenance work on infrastructure (e.g., roadways, bridges, etc.) or other physical assets (e.g., airplanes, fleets of airplanes, wind turbines, power generation and transmission infrastructure, etc.). Another embodiment includes a process for utilization of such systems on one or more computer devices. Other embodiments can also be structured as other types of communication or computer systems.

BACKGROUND

Determination of Inspection and Maintenance (I&M) policies for management of multi-asset infrastructure environments often requires modeling and assessment of different stochastic deterioration effects, together with adept scheduling of action sequences to mitigate risks and serve multi-purpose life-cycle goals. Decision-making in such complex and uncertain system settings comes with major computational challenges, due to heterogeneity of different asset classes, the large number of components resulting in intractable state and action spaces, noisy observations (e.g., subjective data that have limited reliability, etc.), limited availability of resources, and performance-based constraints.

The I&M planning problem can typically be addressed using conventional methods such as threshold-based formulations with reliability analysis principles e.g., in (Saydam & Frangopol, 2014; Bocchini & Frangopol, 2011; Bismut & Straub, 2021), decision tree analysis, e.g., in (Straub & Faber, 2005), application of renewal theory, e.g., in (Grall, et al., 2002; Rackwitz, et al., 2005), utilization of stochastic optimal control, e.g., in (Madanat, 1993; Ellis, et al., 1995; Papakonstantinou & Shinozuka, 2014; Papakonstantinou, et al., 2018).

SUMMARY

We determined that many of the conventional approaches for I&M processes suffer from optimality-, scalability-, and uncertainty-induced complexities. They are also typically not easily extendable to environments with constraints (deterministic or probabilistic). Moreover, despite the fact that the underlying maintenance evaluation and prioritization objectives can be dynamic in nature, many optimization techniques use static formulations. Due to these computational challenges, many practical, conventional techniques are prone to generating widely sub-optimal solutions, especially in settings with large networks (e.g., numerous assets to manage, such as numerous roadways, airplanes to maintain, power generation and distribution assets to maintain, etc.) and long time-horizons (e.g., maintenance that must account for short term as well as long term maintenance priorities that may have to occur on the order of annual work or work that may need to be performed in a 2-year, 5-year, or 10-year maintenance cycle, etc.).

To address the above issues, we developed embodiments of a communication system and computer device structured as a multi-agent Deep Reinforcement Learning (DRL) that can utilize one or more embodiments of an inspection and maintenance prioritization and scheduling process we have developed. Embodiments can utilize a Markov Decision Process (MDP) and/or partially observable Markov decision process (POMDP) in conjunction with the multi-agent DRL approach to allow for adaptive evaluation and prioritization in the presence of noisy real-time data or other ambiguous data (e.g., submitted evaluation report data that may include subjective information or subjective ratings, time series data from multi-modal sensors that may have limited reliability or precision, etc.). In certain embodiments, if the observed data are accurate then the POMDP formulation becomes MDP, thus, it can similarly be utilized for maintenance prioritization and scheduling process. The POMDP framework can be defined by 7 elements that include S, A, P, $\Omega$, O, C, and $\gamma$, where S, A and $\Omega$ are sets of states, actions, and possible observations, respectively, P is the model of transitions, O is an observation model, C are cost functions and $\gamma$ is a discount factor. In POMDPs, the decision-maker (also referred to as an "agent") starts at a state, $s_t$ at a time step, t, takes an action $\alpha_t$, receives a cost, $c_t$, transitions to the next state, $s_{t+1}$, and receives an observation, $o_{t+1} \in \Omega$ based on the observation probability model, $p(o_{t+1}|s_{t+1}, \alpha_t)$. Due to partial observability, the agent can only form a belief $b_t$ about its state, where $b_t$ is a probability distribution over S of all possible discrete states. A Bayesian update can be used to calculate the belief $b_{t+1}$:

$$b(s_{t+1}) = p(s_{t+1}|o_{t+1}, a_t, b_t) = \frac{p(o_{t+1}|s_{t+1}, a_t)}{p(o_{t+1}|b_t, a_t)} \sum_{s_t \in S} p(s_{t+1}|s_t, a_t) b(s_t) \quad \text{(Eq. 1)}$$

where probabilities $b(s_t)$, for all $s_t \in S$, form the belief vector $b_t$ of length $|S|$, and the denominator of (Eq. (Eq. 1), $p(o_{t+1}|b_t, \alpha_t)$ is the standard normalizing constant.

The pre-defined goal for an agent is to choose actions at each time step that minimize its expected future discounted cumulative cost, defined by the value or action-value function, the value function can be defined as:

$$V^{\pi^*}(b_t) = \min_{a_t \in A} \sum_{s_t \in S} b(s_t) c(s_t, a_t) + \gamma \sum_{o_{t+1} \in \Omega} p(o_{t+1}|b_t, a_t) V^{\pi^*}(b_{t+1}) \quad \text{(Eq. 2)}$$

Despite existing mathematical convergence guarantees for POMDPs, traditional point-based POMDP solvers often encounter scalability issues in very large state, observation, and actions spaces. We have developed an application of deep reinforcement learning to utilize in conjunction with the pre-defined POMDP framework to alleviate this dimensionality issue.

Embodiments of reinforcement learning (RL) that can be utilized in embodiments of our apparatus, device, or process can be defined as a computational framework for evaluating and automating goal-directed learning and decision-making for solving MDP/POMDP problems applying the above noted (PO)MDP framework. Embodiments of our RL algorithm can be defined so that it can be combined with deep neural network parametrizations.

The methods for solving RL problems can be majorly classified as value-based or policy-based learning. Value-based methods learn the state or state-action value function and act upon it by selecting the optimal action in each given state. In policy-based learning, policy $\pi: S \rightarrow P(A)$ is directly learned using a separate function approximator (usually a neural network). The policy gradient method is customarily used for learning policies in policy-based methods and the policy gradient, $g_{\theta^\pi}$, can be estimated in a multi-agent actor-critic setting as:

$$g_{\theta^\pi} = \mathbb{E}_{s_t \sim \rho, a_t \sim \mu}[w_t(\nabla_{\theta^\pi} \log \pi(\alpha_t|s_t, \theta^\pi)) A^\pi(s_t, \alpha_t)] \quad \text{(Eq. 3)}$$

where, $s_t = \{s_t^{(i)}\}^m$ state vector for m-component system, $a_t = \{\alpha_t^{(i)}\}^n$ is an action vector for n-agents (no. of agents and no. of components can be different), $\theta^\pi$ is the policy neural network parameter vector, $w_t$ is the importance sampling weight, $\mu$ is a n-dimensional vector of agents' behavior policies, $\rho$ is the in-dimensional state distribution under these policies, and $A^\pi(s_t, a_t)$ is the advantage function defined as $A^\pi(s_t, \alpha_t) = Q^\pi(s_t, \alpha_t) - V^\pi(s_t)$. Advantage can be seen as a zero-mean measure, i.e., $E_{\alpha \sim \pi}[A^\pi(b, \alpha)] = 0$, estimating how advantageous each action is. Advantage function can be further approximated as in (Mnih, et al., 2016; Andriotis & Papakonstantinou, 2019), which reduces the need of action-value function by using only value function with one step look ahead, similar to the TD-learning, as:

$$A^\pi(s_t, \alpha_t|\theta_V) \equiv c(s_t, \alpha_t) + \gamma V^\pi(s_t|\theta_V) - V^\pi(s_t|\theta_V) \quad \text{(Eq. 4)}$$

where, $\theta_V$ are the weight parameters of the critic neural network. The mean squared error is considered as a loss function for the critic neural network:

$$L_V(\theta_V) = \mathbb{E}_{s_t \sim \rho, a_t \sim \mu}[w_t(c(s_t, \alpha_t) + \gamma V^\pi(s_{t+1}|\theta_V) - V^\pi(s_t|\theta_V))^2] \quad \text{(Eq. 5)}$$

where, $L_V(\theta_V)$ is a critic loss function and its gradient can be estimated for updating $\theta_V$ as:

$$g_{\theta_V} = \mathbb{E}_{s_t \sim \rho, a_t \sim \mu}[w_t \nabla_{\theta_V} V^\pi(s_t|\theta_V) A^\pi(s_t, \alpha_t|\theta_V)] \quad \text{(Eq. 6)}$$

Both actor and critic neural networks will be trained using the batch sampling from a buffer memory, storing the agent's experience tuples.

Embodiments can be configured to define a process for planning that can be well-suited for large multi-component systems. Embodiments can define a framework that also considers the presence of constraints through state augmentation and Lagrange multipliers. Further, embodiments can use a sparse parametrization of the actor-neural network without parameter sharing between agents (e.g., each component can have its own actor neural network).

For larger systems, embodiments can be configured to allow for separate critic networks and even sparser actor parametrizations. Some embodiments can employ a fully decentralized logic along the lines of centralized training and decentralized execution, postulating that state accessibility for each actor neural network is restricted to its corresponding component. Component actions, as well as various possible sub-system actions, are assumed conditionally independent given their own state, thus the policy and its gradient now become:

$$\pi(a_t|s_t) = \prod_{i=1}^n \pi_i(a_t^{(i)}|s_t^{(i)}) \quad \text{(Eq. 7)}$$

$$g_{\theta_\pi} = \mathbb{E}_{s_t \sim \rho, a_t \sim \mu}\left[w_t\left(\sum_{i=1}^n \nabla_{\theta_\pi} \log \pi_i(a_t^{(i)}|s_t^{(i)}, \theta_\pi^{(i)})\right) A^\pi(s_t, a_t)\right] \quad \text{(Eq. 8)}$$

For such embodiments, each control unit can be considered an autonomous agent that only utilizes component-state information to decide about its actions, guided also by the system advantage function.

Other embodiments of this aspect can include corresponding techniques, apparatus, and computer programs, designed to execute the actions of the methods that are encoded on a non-transitory computer storage medium (e.g. flash memory, a solid state drive, other memory device on which an application or program can be stored such that at least one processor can run the program or application to perform at least one method defined by the code of the program or application). A computer device running such a program or application can be configured for performing the actions of one or more defined methods. These and other embodiments may each optionally incorporate one or more of the functionalities listed below or elsewhere herein.

In some embodiments, the described DRL framework can have multiple states as input, and these states can directly be obtained from said sensors or from storage devices. These inputs can take the form of vector values, matrices, and images representing the health and other metrics (e.g., condition states, age, time, temperature, budget, etc.) of a said infrastructure system. In some embodiments, these inputs can be discrete or continuous values that are processed and directly be used as input features. In other embodiments, these inputs can be raw vector values, matrices, and images that require additional processing. The embodiments with raw inputs can be processed using regression techniques, machine learning, autoencoders, variational autoencoders, fully connected neural networks, convolutional neural networks, transformers, and other forms.

Further, the said multi-agent DRL framework can incorporate multiple types of outputs, discrete or continuous values. The discrete values may represent the categorized inspection and maintenance prioritization selection or other aggregated action information, and the continuous output may represent specific adaptive control related to the asset type (e.g., appropriate rotation of solar panels for maximum output based on solar angle, movement of wind turbine blades for maximum efficiency based on wind direction, etc.).

Some embodiments may incorporate various computational environments in relation to the state-action interaction of an asset, these can range from actual environment, stochastic models, black-box models, dynamic Bayesian networks, random fields/random processes, etc.

Some embodiments can include the cases where the underlying asset deterioration model is unknown and/or ambiguous, which can simultaneously be updated from the data using regression techniques, Bayesian techniques, machine learning, etc. These deterioration models can incorporate various factors relating to various hazards, fatigue, temperature fluctuations, rare loading events (e.g., earthquakes, hurricanes, cyclones, etc.), and many others.

Other embodiments may include joint optimization of asset and sensor management in the context of structural health monitoring, for example, optimal sensor location, sensor replacement, etc., along with maintenance prioritization and scheduling of the asset components.

Embodiments can utilize a single computer device, a network of devices, or multiple networks of devices. In some embodiments, a system can utilize one or more servers that host a service that receive data from one or more sensors and other data from one or more other computer devices or servers to generation of graphical user interface displays or other output to facilitate inspection and maintenance management planning for various physical assets (e.g., roadways and bridges, airplanes, a fleet of vehicles or airplanes, power generation and distribution equipment, etc.).

For example, some embodiments of a communication apparatus can include a computer device having a processor connected to a non-transitory computer readable medium. The computer device can be configured to:
(1) initialize actor neural network weights for a pre-selected number of actors for an episode;
(2) initialize critic neural network weights and Lagrange multipliers for the episode;
(3) determine current beliefs based on asset condition states, model parameters, and pre-defined deterministic constraint metrics;
(4) sample actions from actor neural network outputs or at random and sample an observation from a pre-defined observation probability model for determining a total cost, probabilistic constraints ("probabilistic constraint metrics") and beliefs for a next step of the episode;
(5) repeat (1)-(4) until the episode ends;
(6) sample a batch of experiences based on a current belief, deterministic constraint metrics, actions, costs, and probabilistic constraint metrics, and the beliefs, deterministic constraint metrics, actions, costs, and probabilistic constraint metrics for the next step, at the end of the episode;
(7) calculate an advantage function;
(8) update the actor neural network weights, the critic neural network weights and the Lagrange multipliers for a next episode; and
(9) repeat (3)-(8) until a convergence condition is detected.

Embodiments of the communication apparatus can be provided so that the computer device is configured to generate a graphical user interface (GUI) to display at least one graphical element based on data obtained after the convergence condition is detected.

In some embodiments, the computer device can be a server that is configured to receive sensor data and/or record data from at least one of: (i) at least one user device communicatively connectable to the computer device, (ii) at least one sensor, and (iii) a record storage device communicatively connectable to the computer device. Some embodiments can be adapted so the server receives data from all of these devices. Other embodiments can be configured so that the server only receives data from one or two of these three elements.

In some implementations, the computer device can be a management device that is communicatively connectable to a user device to generate a GUI for display of at least one graphical element at a user device based on data obtained after the convergence condition is detected.

In some embodiments, the pre-selected number of actors can include decentralized actors with centralized input or decentralized input for the episode.

In some implementations of the apparatus, the advantage function can be calculated based on system type, component type, and/or action type.

Embodiments of the communication apparatus can include other elements. For example, the computer device can include the record storage device, at least one sensor and/or at least one user device communicatively connectable to the computer device. Embodiments of the apparatus can also include other features or elements.

A process for maintenance prioritization and scheduling is also provided. Embodiments of the process can include:
(1) initializing actor network weights for a pre-selected number of actors for an episode;
(2) initializing critic network weights and Lagrange multipliers for the episode;
(3) determining current beliefs based on asset condition states, model parameters and pre-defined deterministic constraint metrics;
(4) sampling actions from actor network outputs or at random and sample an observation from a pre-defined observation probability model for determining a total cost, probabilistic constraints ("probabilistic constraint metrics") and beliefs for a next step of the episode based on the determined current beliefs;
(5) repeating (1)-(4) until the episode ends;
(6) sampling a batch of experiences based on a current belief, deterministic constraint metrics, actions, costs, and probabilistic constraint metrics, and the beliefs, permanent constraint metrics, actions, costs, and probabilistic constraint metrics for the next step, at the end of the episode;
(7) calculating an advantage function; and
(8) updating the actor network weights, the critic network weights and the Lagrange multipliers for a next episode;
(9) repeating (3)-(8) until a convergence condition is detected.

Embodiments of the process can also include other steps or features. For example, the process can also include generating a GUI to display at least one graphical element based on data obtained after the convergence condition is detected and/or providing data to at least one user device for generation of the GUI. For instance, the process can be performed by a management device that is communicatively connectable to a user device to generate the GUI in some embodiments.

As another example, embodiments of the process can include receiving sensor data and/or record data from at least one of: (i) at least one user device communicatively connectable to the computer device; (ii) at least one sensor; and (iii) a record storage device communicatively connectable to the computer device. Such embodiments can only use one of these items, any combination of two of these items, or all three of these items.

Some embodiments can be adapted so that the pre-selected number of actors include decentralized actors with centralized input or decentralized input for the episode. Also (or alternatively), the advantage function can be calculated based on system type, component type, and/or action type.

A non-transitory computer readable medium having code stored thereon that defines a method that is performable by a computer device when a processor of the computer device runs the code is also provided. The method that can be performed when the computer device runs the code can include:

(1) initializing actor network weights for a pre-selected number of actors for an episode;
(2) initializing critic network weights and Lagrange multipliers for the episode;
(3) determining current beliefs based on asset condition states, model parameters and pre-defined deterministic constraint metrics;
(4) sampling actions from actor network outputs or at random and sample an observation from a pre-defined observation probability model for determining a total cost, probabilistic constraints ("probabilistic constraint metrics") and beliefs for a next step of the episode based on the determined current beliefs;
(5) repeating (1)-(4) until the episode ends;
(6) sampling a batch of experiences based on a current belief, deterministic constraint metrics, actions, costs, and probabilistic constraint metrics, and the beliefs, permanent constraint metrics, actions, costs, and probabilistic constraint metrics for the next step, at the end of the episode;
(7) calculating an advantage function;
(8) updating the actor network weights, the critic network weights and the Lagrange multipliers for a next episode;
(9) repeating (3)-(8) until a convergence condition is detected.

In some embodiments of the non-transitory computer readable medium, the computer device can be a management device that is communicatively connectable to a user device to generate a GUI. The method defined by the code that can be performed when a device runs the code can also include generating GUI data for display of at least one graphical element in a GUI based on data obtained after the convergence condition is detected.

It should be appreciated that other embodiments of the process, apparatus, or non-transitory computer readable medium can include other features or elements. For instance, examples of such elements or features can be appreciated from the discussion of exemplary embodiments provided herein.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of a communication system and computer device that can utilize one or more embodiments of inspection and maintenance prioritization and scheduling process are shown in the accompanying drawings and certain exemplary methods of making and practicing the same are also illustrated therein. It should be appreciated that like reference numbers used in the drawings may identify like constituents.

DETAILED DESCRIPTION

Figure 1:
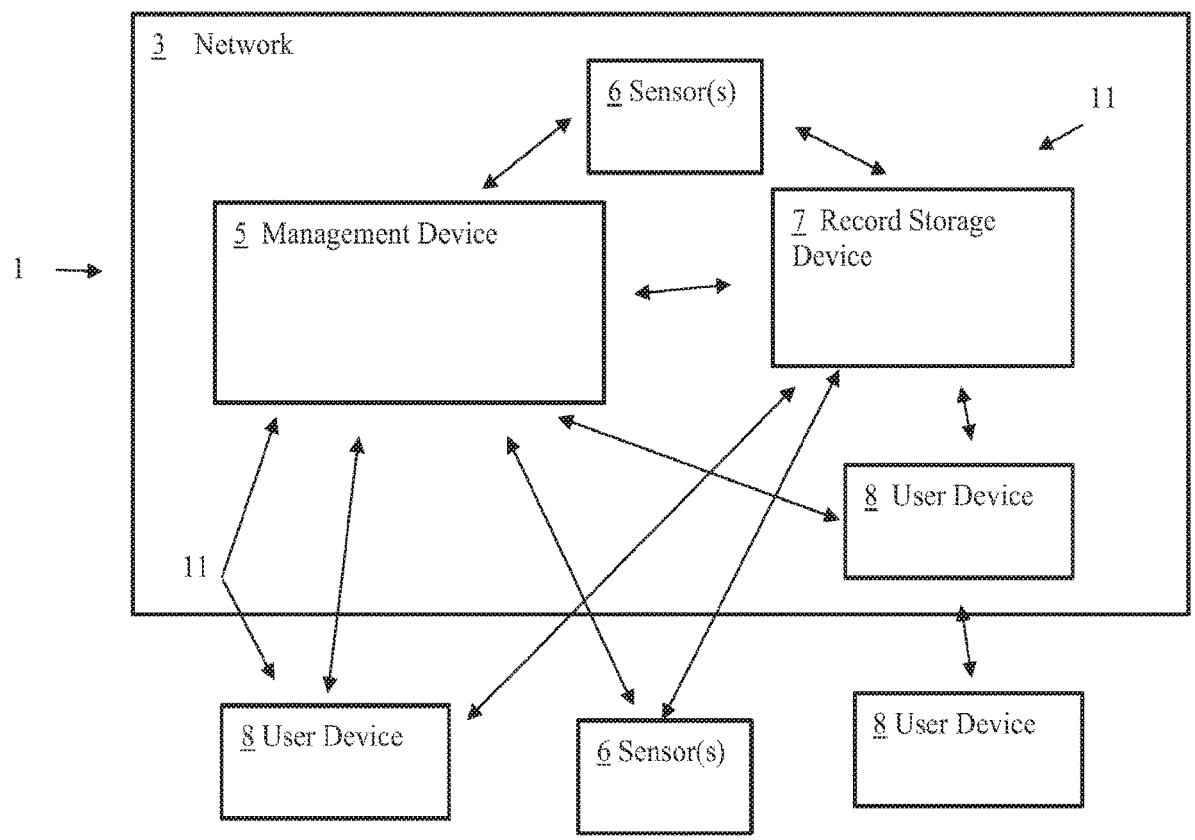
FIG. 1 is a block diagram of an exemplary embodiment of a communication system that can utilize one or more exemplary embodiments of a computer device along with one or more exemplary computer programs that can be configured to define at least one method to be performed when a device or apparatus runs the code of one or more computer programs. The actions taken by the apparatus or computer device can be steps of the methods, encoded on computer storage device(s), to perform an embodiment of the process for maintenance prioritization and scheduling.
Figure 2:
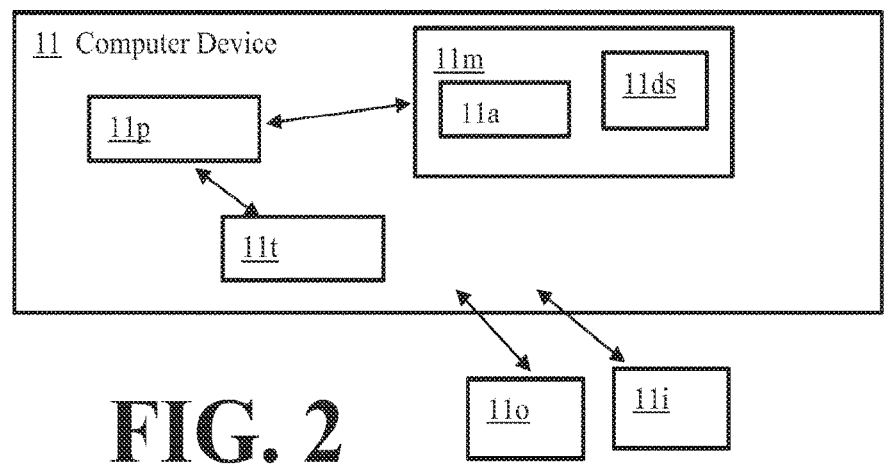
FIG. 2 is a block diagram of an exemplary embodiment of a computer device 11 that can be utilized in the exemplary embodiment of a computer system shown in FIG. 2.

Referring to FIGS. 1-7, a communication system 1 can include a network 3 that includes a number of computer devices 11. The computer devices 11 can include a management device 5 and a record storage device 7. The management device 5 and record storage device 7 can each be configured as a server or other type of computer device that can be configured as a communication device that hosts one or more services.

The record storage device 7 can include non-transitory memory that stores sensor data and/or asset evaluation data (e.g., evaluation forms, etc.) that may be communicated to the record storage device by one or more sensors 6 and one or more user devices 8. The record storage device 7 can be configured to provide this data or a portion of this data to the management device 5.

The management device 5 can also include non-transitory memory that stores sensor data and/or asset evaluation data (e.g., evaluation forms, etc.) that may be communicated to the management device 5 by one or more sensors 6 and one or more user devices 8. In some embodiments, the management device 5 can receive such data so the record storage device 7 is not needed. In other embodiments, the management device can receive such data and also communicate with the record storage device 7 to receive additional data. In yet other embodiments, the management device 5 may not receive any data from the sensors 6 or user devices 8. Instead, such data may be received by the management device 5 via the record storage device 7.

The user devices 8 can be a type of computer device 11 configured as a communication device such as a personal computer (PC), a laptop computer, a smart phone, a tablet, or other type of communication terminal. The sensors 6 can be sensors configured to monitor one or more conditions of an asset, such as a road, bridge, airplane component, electricity power, generation or transmission component, or other type of physical asset of a plurality of physical assets that may require different levels of maintenance to preserve the asset and maintain the asset's functionality to a desired level (e.g., to keep the asset functionality above a pre-selected failure threshold, outside of a pre-selected non-working threshold, or within a pre-selected safety threshold, etc.).

Each computer device 11 of the system 1 (e.g., management device 5, record storage device 7, user devices 8) can include hardware. The hardware can include a processor $11p$ that is connected to non-transitory memory $11m$ and at least one transceiver $11t$. The memory $11m$ can store at least one application $11a$ thereon and one or more data-stores $11ds$ thereon. The data-stores $11ds$ can include files, sensor data, evaluation data, measurement data, databases, or other types of data or files. The transceiver $11t$ can include one or more transceivers for communications with other devices. The transceiver $11t$ can include, for example, a Wi-Fi transceiver, a local area network card, an Ethernet transceiver (e.g., an Ethernet card and interface), a Bluetooth transceiver, a near field communication transceiver, a cellular network transceiver, or other type of communication transceiver. Each computer device 11 can include or be communicatively connected to one or more output devices $11o$ and one or more input devices $11i$. Input/output devices such as a touch screen display can be considered an input device $11i$ and/or an output device $11o$. Examples of input devices can include a touch screen display, a microphone, a button, keyboard, stylus, pointer device. Examples of an output device $11o$ can include a display, touch screen display, monitor, printer, or speaker.

Sensors 6 can include computer devices 11 or can be configured to communicate data to one or more computer devices 11. Examples of sensors can include temperature sensors, pressure sensors, acoustic sensing, infrared/thermal imaging sensors, ground penetrating radar, coring and chipping sensors, potentiometers, thermocouples, half-cell potential tests, composition detectors, or other types of detectors or condition detection mechanisms. The sensors 6 can provide data to the record storage device 7 and/or management device 5 or can provide data to one or more user devices 8, which can forward that data, portions of that data, or computer device data that is based on the received sensor data to the record storage device 7 and/or management device 5. Examples of such data can include visual inspection reports or report data, image data, raw sensor data, time series data, portions of the sensor data that fall within a pre-selected set of criteria, or user device data that is based on the sensor data (e.g., sensor data after it has been filtered or otherwise analyzed for providing to the management device 5 and/or record storage device 7).

As mentioned above, in some embodiments, the management device 5 can communicate with the record storage device 7 to receive data and/or files stored in the memory of the record storage device 7. This data can be to supplement data already stored in memory of the management device 5 (e.g., as one or more data stores) or can be the data the management device may use to evaluate the performance of an embodiment of the maintenance prioritization and scheduling process. In other embodiments, the management device 5 can receive data from the user devices 8 and sensors 6 and store that in its memory for access and use in performance of an embodiment of the maintenance prioritization and scheduling process.

The communication system 1 can also include other components. For instance, the communication system can include access points, routers, gateways, session border controllers, or other types of network elements (e.g., intra-network communication nodes, internetwork communication nodes, base stations, other servers that host other services etc.).

The communication system 1 can also be configured so one or more user devices 8, the management device 5 or the record storage device 7 can receive data from one or more cloud-based services or other communication devices 1. In yet other embodiments, the management device 5 can be a cloud-based device that can communicate with other devices (e.g., record storage device 7, user devices 8, and/or sensors 6) via at least one internet connection or cloud-based communication connection. In such an embodiment, the network 1 can include the network environment of the management device 5 and the one or more networks of the record storage device 7 and/or user devices 8 (e.g., one or more local area networks (LANs), an enterprise network, etc.).

As can be appreciated from FIGS. 3-7, embodiments of the system 1 and computer devices 11 can be configured to perform an embodiment of a maintenance prioritization and scheduling process. The implementation of this process can be defined by code of an application stored in the memory of the management device 5 or a user device 8, for example. An embodiment of the code of the application that can be run on such a computer device can be referred to herein as a Deep Decentralized Multi-agent Actor-Critic, or DDMAC-CTDE.

As mentioned above, embodiments can utilize a partially observable Markov Decision Process (POMDP) and a multi-agent Deep Reinforcement Learning (DRL) approach to allow for adaptive evaluation and prioritization in the presence of noisy real-time data or other noisy data (e.g., submitted evaluation report data that may include subjective information or subjective ratings, sensor data that may have limited reliability or precision, etc.).

The POMDP framework can be defined by elements that include S, A, P, Ω, O, C, and γ, where S, A and Ω are sets of states, actions, and possible observations, respectively, P is the model of transitions, O is an observation model, C are cost functions and γ is a discount factor. In POMDPs, the decision-maker (also referred to as an "agent") starts at a state, $s_t$ at a time step, t, takes an action $\alpha_t$, receives a cost, $c_t$, transitions to the next state, $s_{t+1}$, and receives an observation, $o_{t+1} \in \Omega$ based on the observation probability model, $p(o_{t+1}|s_{t+1}, \alpha_t)$. Due to partial observability, the agent can only form a belief $b_t$ about its state, where $b_t$ is a probability distribution over S of all possible discrete states. A Bayesian update can be used to calculate the belief $b_{t+1}$:

$$b(s_{t+1}) = p(s_{t+1}|o_{t+1}, a_t, b_t) = \frac{p(o_{t+1}|s_{t+1}, a_t)}{p(o_{t+1}|b_t, a_t)} \sum_{s_t \in S} p(s_{t+1}|s_t, a_t) b(s_t) \quad \text{(Eq. 9)}$$

where probabilities $b(s_t)$, for all $s_t \in S$, form the belief vector $b_t$ of length $|S|$, and the denominator of (Eq. (Eq. 1), $p(o_{t+1}|b_t, \alpha_t)$ is the standard normalizing constant. (Eq. 9 is the same as the above Eq. 1).

The pre-defined goal for an agent is to choose actions at each time step that minimize its expected future discounted cumulative cost, defined by the value or action-value function, which can be defined as:

$$V^{\pi^*}(b_t) = \min_{a_t \in A} \sum_{s_t \in S} b(s_t) c(s_t, a_t) + \gamma \sum_{o_{t+1} \in \Omega} p(o_{t+1}|b_t, a_t) V^{\pi^*}(b_{t+1}) \quad \text{(Eq. 10)}$$

Embodiments of reinforcement learning (RL) can be defined as a computational framework for evaluating and automating goal-directed learning and decision-making for solving POMDP problems applying the above noted POMDP framework. Embodiments of our RL algorithm can be defined in the code of an application 11app stored on memory 11m.

The methods for solving RL problems can be classified as value-based or policy-based learning. Value-based methods learn the state or state-action value function and act upon it by selecting the optimal action in each given state. In policy-based learning, policy $\pi: S \rightarrow P(A)$ is directly learned using a separate function approximator (usually a neural network). The policy gradient method is customarily used for learning policies in policy-based methods and the policy gradient, $g_{\theta_\pi}$, can be estimated in a multi-agent actor-critic setting as:

$$g_{\theta_\pi} = \mathbb{E}_{s_t \sim \rho, a_t \sim \mu} [w_t (\nabla_{\theta_\pi} \log \pi(\alpha_t|s_t, \theta_\pi)) A^\pi(s_t, \alpha_t)] \quad \text{(Eq. 11)}$$

where, $s_t = \{s_t^{(i)}\}^m$ state vector for m-component system, $a_t = \{a_t^{(i)}\}^n$ is an action vector for n-agents (no. of agents and no. of components can be different), $\theta^\pi$ is the policy neural network parameter vector, $w_t$ is the importance sampling weight, μ is a n-dimensional vector of agents' behavior policies, ρ is the in-dimensional state distribution under these policies, and $A^\pi(s_t, a_t)$ is the advantage function defined as $A^\pi(s_t, \alpha_t) = Q^\pi(s_t, \alpha_t) - V^\pi(s_t)$. Advantage can be seen as a zero mean measure i.e., $E_{\alpha \sim \pi}[A^\pi(b, \alpha)] = 0$, estimating how advantageous each action is. Advantage function can be further approximated as in (Mnih, et al., 2016; Andriotis & Papakonstantinou, 2019), which reduces the need of action-value function by using only value function with one step look ahead, similar to the TD-learning, as:

$$A^\pi(s_t, \alpha_t|\theta_V) \cong c(s_t, \alpha_t) + \gamma V^\pi(s_t|\theta_V) - V^\pi(s_t|\theta_V) \quad \text{(Eq. 12)}$$

where, $\theta_V$ are the weight parameters of the critic neural network. The mean squared error is considered as a loss function for the critic neural network:

$$L_V(\theta_V) = \mathbb{E}_{s_t \sim \rho, a_t \sim \mu} [w_t (c(s_t, \alpha_t) + \gamma V^\pi(s_{t+1}|\theta_V) - V^\pi(s_t|\theta_V))^2] \quad \text{(Eq. 13)}$$

where, $L_V(\theta_V)$ is a critic loss function and its gradient can be estimated for updating $\theta_V$ as:

$$g_{\theta_V} = \mathbb{E}_{s_t \sim \rho, a_t \sim \mu} [w_t \nabla_{\theta_V} V^\pi(s_t|\theta_V) A^\pi(s_t, \alpha_t|\theta_V)] \quad \text{(Eq. 14)}$$

Both actor and critic neural networks will be trained using batch sampling from a buffer memory, storing the agent's experience tuples.

For larger systems, embodiments can be configured to allow for separate critic networks and even sparser actor parametrizations. Some embodiments can employ a fully decentralized logic along the lines of centralized training and decentralized execution, thus, an exemplary embodiment of the process can be termed as DDMAC-CTDE, postulating that state accessibility for each actor neural network is restricted to its corresponding component. Component actions, as well as various possible sub-system actions, can be assumed conditionally independent given their own state, such that the policy and its gradient are:

$$\pi(\alpha_t|s_t, \theta_\pi) = \Pi_{i=1}^n \pi_i(\alpha_t^{(i)}|s_t^{(i)}, \theta_\pi^{(i)}) \quad \text{(Eq. 15)}$$

$$g_{\theta_\pi} = \mathbb{E}_{s_t \sim \rho, a_t \sim \mu} [w_t (\Sigma_{i=1}^n \nabla_{\theta_\pi} \log \pi_i(\alpha_t^{(i)}|s_t^{(i)}, \theta_\pi^{(i)})) A^\pi(s_t, \alpha_t)] \quad \text{(Eq. 16)}$$

Figure 3:
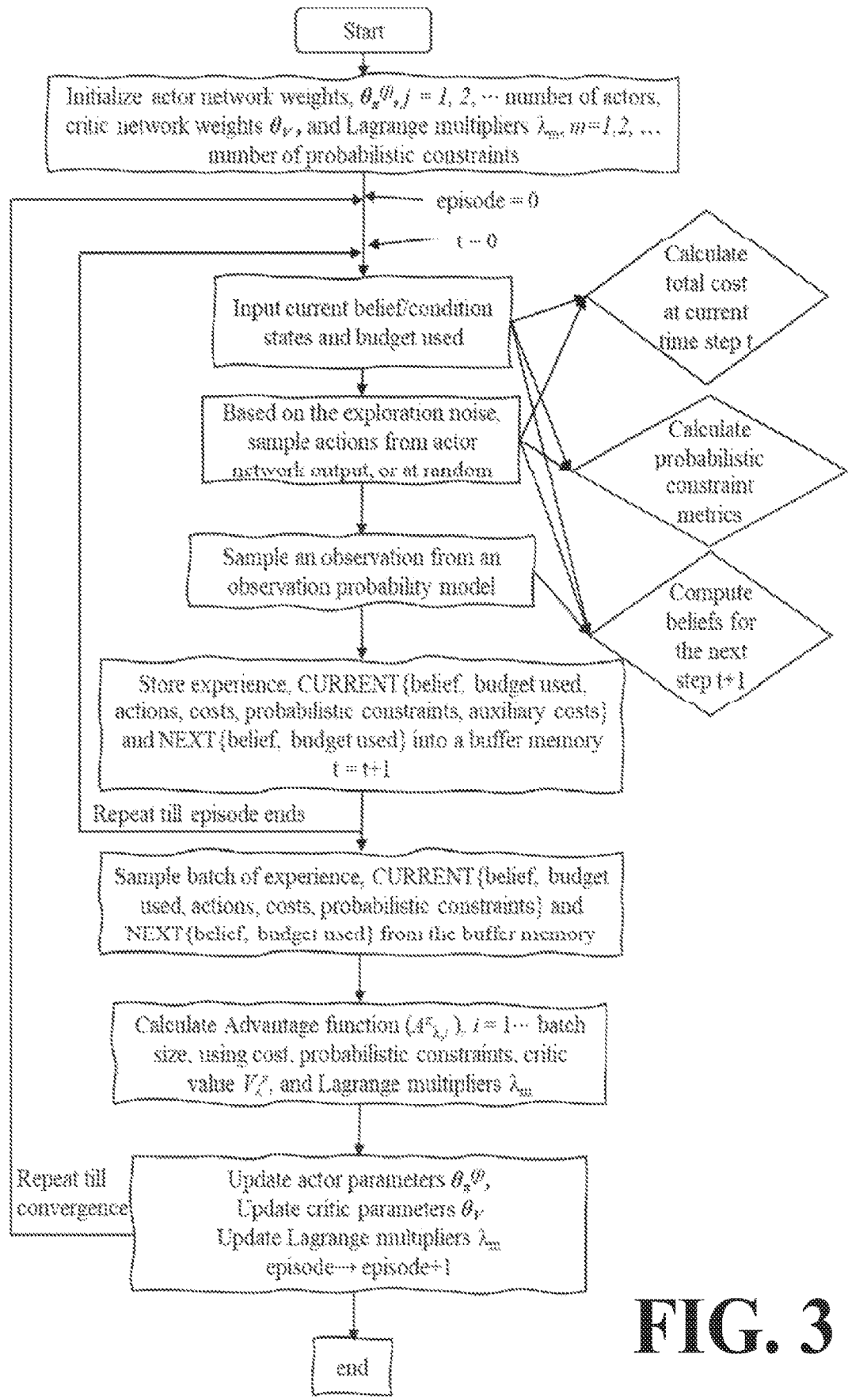
FIG. 3 is a flow chart illustrating exemplary steps that can be performed when implementing a first exemplary embodiment of a process for inspection and maintenance prioritization and scheduling.

For such embodiments, each control unit can be considered an autonomous agent that only utilizes component-state information to decide about its actions, guided also by the system advantage function. FIG. 3 represents the steps for the DDMAC-CTDE embodiment.

The objective in life-cycle management engineering problems is to obtain optimal sequential decisions based on an optimal policy $\pi^*$ which can incorporate the notions of resource scarcity, risks, and other constraints that need to be satisfied over the life-cycle. This goal of the decision-maker (agent) may be interpreted as determining an optimum policy $\pi = \pi^*$ that minimizes the entire cumulative future operational costs and risks given the constraints:

$$\pi^* = \underset{\pi \in \Pi}{\operatorname{argmin}} E_{s_{0:T}, o_{0:T}, a_{0:T}} \left[ \sum_{k=0}^T \gamma^t c | a_t \sim \pi(o_{0:t}, a_{0:t-1}), s_0 \sim b_0 \right] \quad \text{(Eq. 17)}$$

$$\text{s.t. } G_{h,k} = \sum_{t=0}^T \gamma_h^t g_{h,k}(s_t, a_t) - \alpha_{h,k} \leq 0, k = 1, \ldots, K$$

$$G_{s,m} = E_{s_{0:T}, o_{0:T}, a_{0:T}} \left[ \sum_{t=0}^T \gamma_s^t g_{s,m}(s_t, a_t, s_{t+1}) \right] - \alpha_{s,m} \leq 0, m = 1, \ldots, M$$

where $c=c(s_t, \alpha_t, s_{t+1})$ is the cost incurred at time t by taking action $\alpha_t$, transitioning from state $s_t$ to state $s_{t+1}$ and taking an observation $o_t$; $\gamma, \gamma_h$, and $\gamma_s \in [0,1]$ are the discount factors for cost, deterministic constraint, and probabilistic constraints, respectively; $b_0$ is an initial belief, and T is the length of the planning horizon; $G_{h,k}$ and $G_{s,m}$ are the deterministic and probabilistic constraints, respectively; $g_{h,k}$ and $g_{s,m}$ are their respective auxiliary costs; and $\alpha_{h,k}, \alpha_{s,m}$ are real-valued scalars. The policy function belongs to a space, $\pi \in \Pi_c$, which contains all possible policies that are admissible under the existing constraints of the problem. $\Pi_c$ is a subset of $\Pi$, which is the policy space of the unconstrained problem.

The constraint structure in (Eq. 17) is adaptable to a wide variety of constraint types important to inspection and maintenance management problems. Deterministic constraint metrics, for example, may be used to simulate a wide range of fixed resource allocation and control action availability problems, such as those with budget restrictions. In turn, probabilistic constraints in the form of (Eq. 17) may be used to represent constraints that need to be satisfied in expectation, such as risk-based or performance-based constraints (e.g., setting goals for good/poor condition levels and many others). Through state augmentation, one may easily account for deterministic constraints, however, including probabilistic constraints through the same way is impractical since one must then track the full distribution of the cumulative discounted value of $g_{s,m}$. As a result, probabilistic constraints are handled using Lagrange multipliers and Lagrangian relaxation herein. FIG. 3 illustrates an example implementation of the above noted process that can be defined by code of an application stored in the memory of a computer device 11 (e.g., the management device 5). From the flow chart, actor and critic network weights are first initialized along with the Lagrange multipliers as coefficients of probabilistic constraint metrics, noted above, then we start the episode with inputs such as current beliefs on condition states (for first time step, the starting state), model parameters, and deterministic constraint metrics. Based on the exploration noise, actions can be sampled from actor neural network output and/or via uniform random sampling. Further, observations can be sampled from pre-defined observation probability model. Now, with all the information on current beliefs, and sampled actions and observations, the metrics like total cost, probabilistic constraints and next step beliefs can be estimated.

Thereafter, the experience is stored. This can include the current beliefs, defined deterministic constraint metrics, costs, probabilistic constraint metrics. The stored experience can also include the next step beliefs, deterministic constraint metrics or other parameters. The collected experience data can be stored in the memory 11m of the management device 5, for example. The process for experience generation and storage can be repeated until a pre-selected episode ends.

Figure 6:
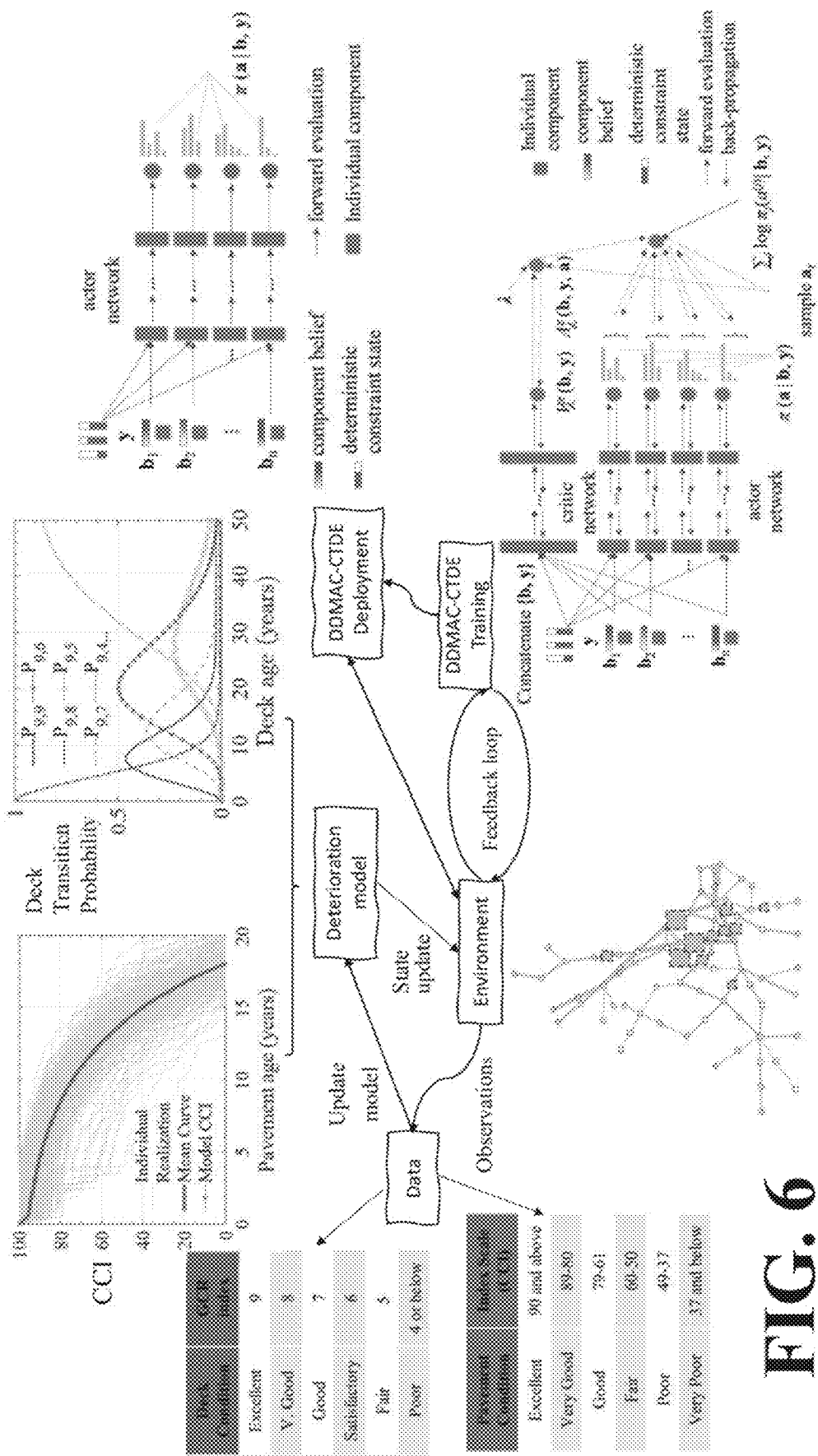
FIG. 6 is a flow chart illustrating exemplary steps of the first exemplary embodiment of a process for inspection and maintenance prioritization and scheduling that can be performed by an exemplary embodiment of the communication system shown in FIG. 1 and/or a computer device 11 of the communication system shown in FIG. 1 that illustrates how the state and action parameters can be accounted for when performing the embodiment of the process.
Figure 7:
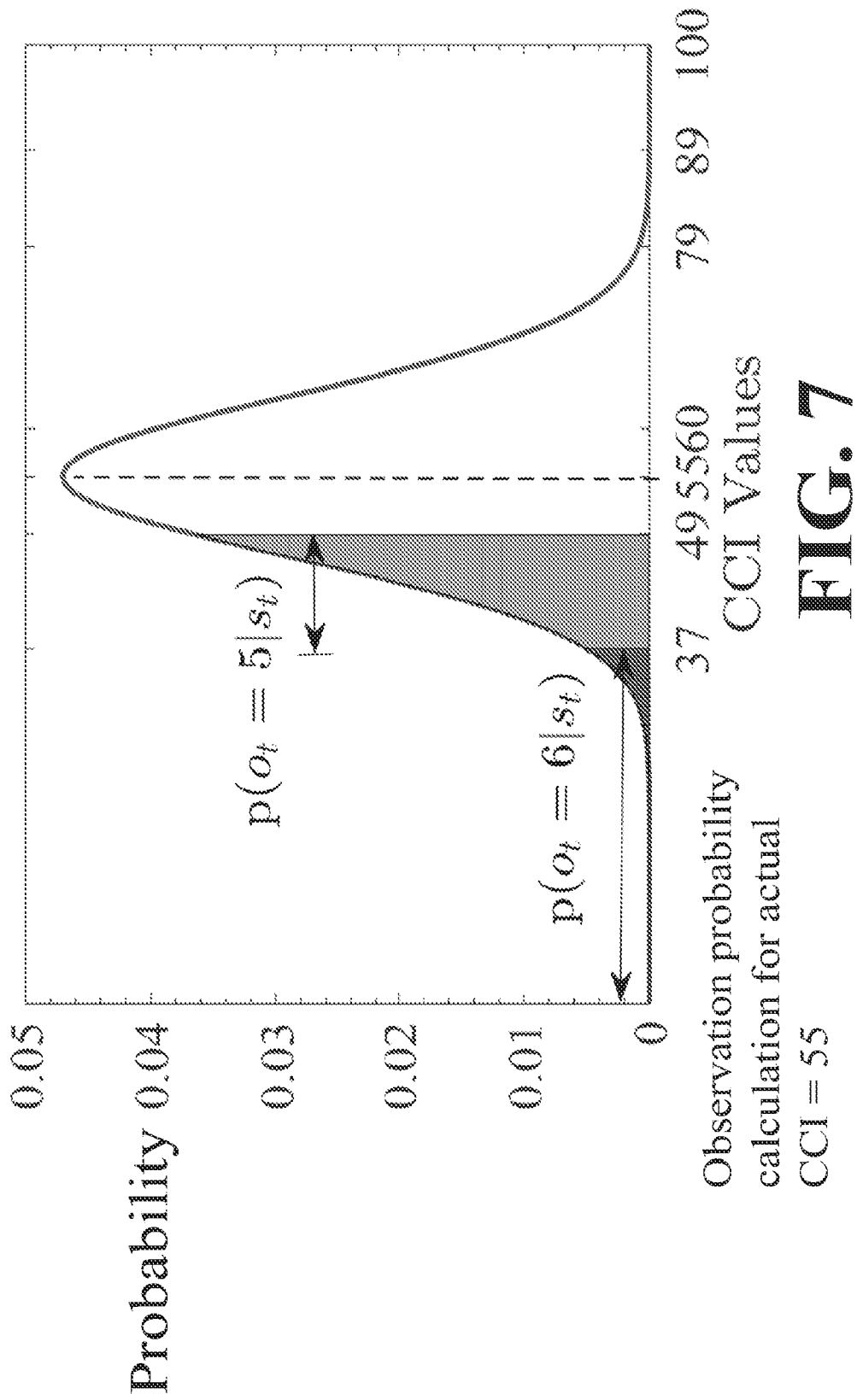
FIG. 7 is a graph illustrating an exemplary observation probability calculation for an actual CCI of 55 that can be used when implementing the exemplary embodiment of the process steps of the exemplary embodiment of the process for maintenance prioritization and scheduling shown in FIG. 6.

After a defined episode has ended, a batch of stored experiences can be sampled as shown in FIG. 3. A pre-defined advantage function can then be utilized for updating actor parameters, critic parameters and Lagrange multipliers for the next episode using gradient based techniques. The process can then be repeated until a pre-defined convergence condition is met. The processing may then stop or end. FIG. 6 illustrates another flow chart showing the iterative nature of this process and how different stations, belief states, costs, actions, and observations can be accounted for as discussed above with reference to FIG. 3. FIG. 7 illustrates a calculation of observation probabilities using a normal distribution curve, which can help in estimating the belief state of the asset used in FIG. 5.

Figure 5:
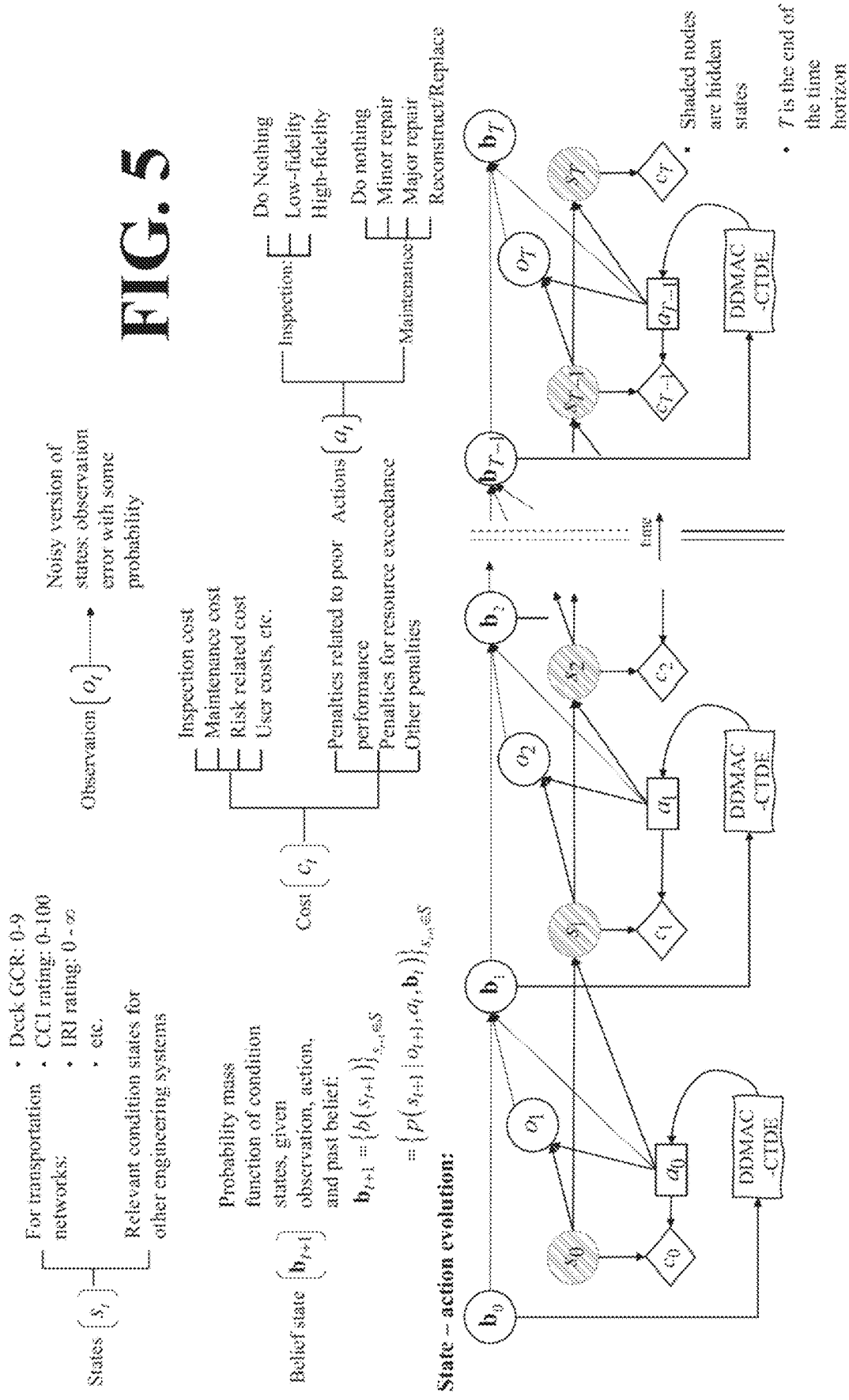
FIG. 5 is a flow chart illustrating the first exemplary embodiment of a process for inspection and maintenance prioritization and scheduling that can be performed by an exemplary embodiment of the communication system shown in FIG. 1 and/or a computer device 11 of the communication system shown in FIG. 2.

FIG. 5 illustrates a flow chart of the system's utilization of sensor data from structural health monitoring (e.g., time series response, image based, etc.) and other forms of data (e.g., inspection record data, maintenance action records, etc.) to perform an embodiment of the maintenance prioritization and scheduling process. As discussed above with reference to FIG. 3, data can be obtained and fed into a pre-determined deterioration model (e.g., deterministic models, stochastic models, black box models, dynamic Bayesian networks, and many others). For most engineering applications described earlier, these models may not be accurate and have associated model uncertainty. In some embodiments, the model uncertainty can be tackled via model updating techniques (e.g., Bayesian model updating, machine learning techniques, etc.) with the help of incoming data.

Other embodiments may include joint optimization of asset and sensor management in the context of structural health monitoring, for example, optimal sensor location, sensor replacement, etc., along with maintenance prioritization and scheduling of the asset components.

Figure 4:
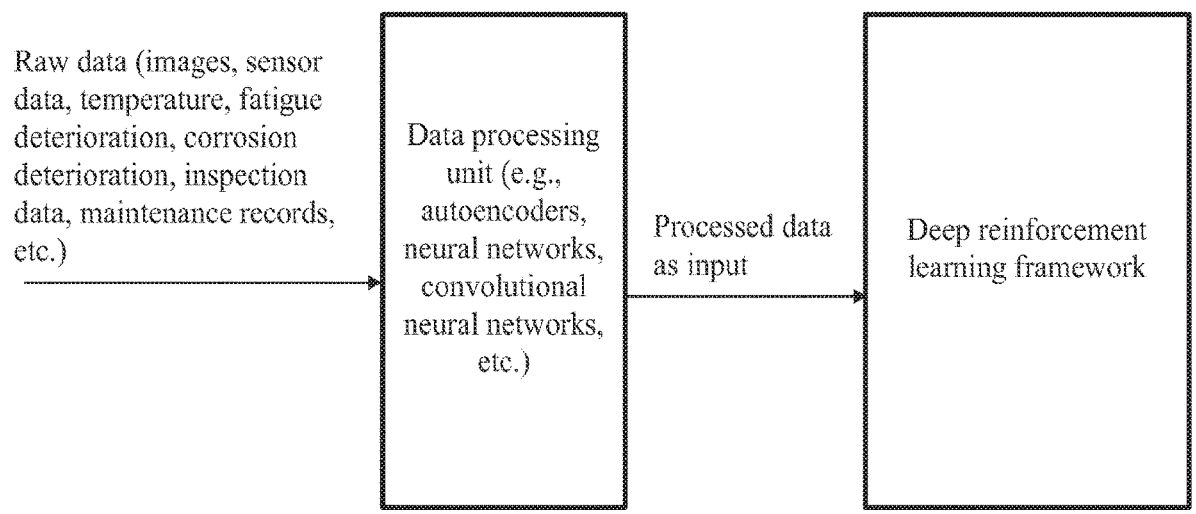
FIG. 4 is a diagram representing the first exemplary embodiment with raw inputs which shows data processing unit and the deep reinforcement learning framework.

In some embodiments, the incoming sensor data may be raw, which can take the form of vector values, matrices, and images representing the health and other metrics (e.g., time-series data, condition states, age, time, temperature, budget, etc.) for the assets and can be obtained from sensors, inspection records, etc. The raw input data may need an additional processing step. The data processing can be performed using regression techniques, matrix decomposition, machine learning, autoencoders, variational autoencoders, fully connected neural networks, convolutional neural networks, transformers, and other forms. It is represented as a data processing unit, shown in FIG. 4, which takes the raw data as input, and using one of the mentioned techniques, we get the processed data/features as output that can be used in the DRL framework as represented in FIG. 4. Then, the data can be used in a computer device (e.g., management device 5) so the embodiment is run to perform the optimization to evaluate the data as discussed above with reference to FIG. 3. The evaluated data can be provided for use in generation of one or more outputs as shown in FIG. 6, for example. The outputs can include a graphical illustration or a display providable in a Graphical User Interface (GUI) that can show the evolution of condition states based on the corresponding actions recommendations from the proposed DRL framework for different assets. Further, outputs can include graphs that can illustrate different asset risk profiles for current assets and projections to facilitate a review of the assets and maintenance scheduling to account for the illustrated risks and asset conditions determined by the computer device running the DDMAC-CTDE code.

It should be appreciated that graphical illustrations included in FIGS. 6 and 7 can be generated as output to a user via an output device 1o (e.g., display or printer). The graphical illustrations can help identify different assets, current conditions for those assets and risk estimations associated with those assets to indicate a maintenance priority to address a pre-selected set of risk criteria.

Example

In one embodiment, an existing transportation network from Hampton Roads, Virginia, USA is considered as an example to demonstrate the efficacy of an embodiment of the proposed framework. The considered network of assets includes 85 pavement and 11 bridge components. Various indicators can describe the pavement condition, e.g., Pavement Condition Index (PCI), Critical Condition Index (CCI), International Roughness Index (IRI), and Load Related Distress Index (LDR), among many others. CCI (ranges from 0-100) and IRI were used in this example as they offered a joint quantification of condition, as per structural distresses and ride quality, respectively. A non-stationary CCI model was used in this embodiment as a modified version based on a Virginia Department of Transportation (VDOT) report. The mean CCI model used in this example incorporated various aspects, including different traffic levels, pavement age, etc.

A gamma process was utilized, with its mean being in time equal to the modified mean CCI predictions and a relevant model variance. The details are provided below on how to obtain CCI transition probabilities for this example.

$$Ga(DI|f(t), g(t)) = \frac{g(t)^{f(t)}}{\Gamma(f(t))} DI^{f(t)-1} e^{-g(t)DI} \quad \text{(Eq. 18)}$$

where, $Ga(\cdot)$ is gamma distribution density function, $DI=100-CCI$ is a damage index. The gamma process is parametrized here by a non-negative time varying scale parameter function $g(t)$ and a non-negative time-varying shape parameter function $f(t)$, and $\Gamma(u)=\int_0^\infty v^{u-1}e^{-v}dv$. The relevant parameters are estimated in time based on the mean DI prediction model $\mu_{DI}(t)$ and the model variance $\sigma_s^2(t)$. The relationship between the gamma process parameter functions and $\mu_{DI}$, $\sigma_s$ is given as:

$$\mu_{DI}(t) = \frac{f(t)}{g(t)}, \sigma_s(t) = \frac{\sqrt{f(t)}}{g(t)} \quad \text{(Eq. 19)}$$

Figure 8:
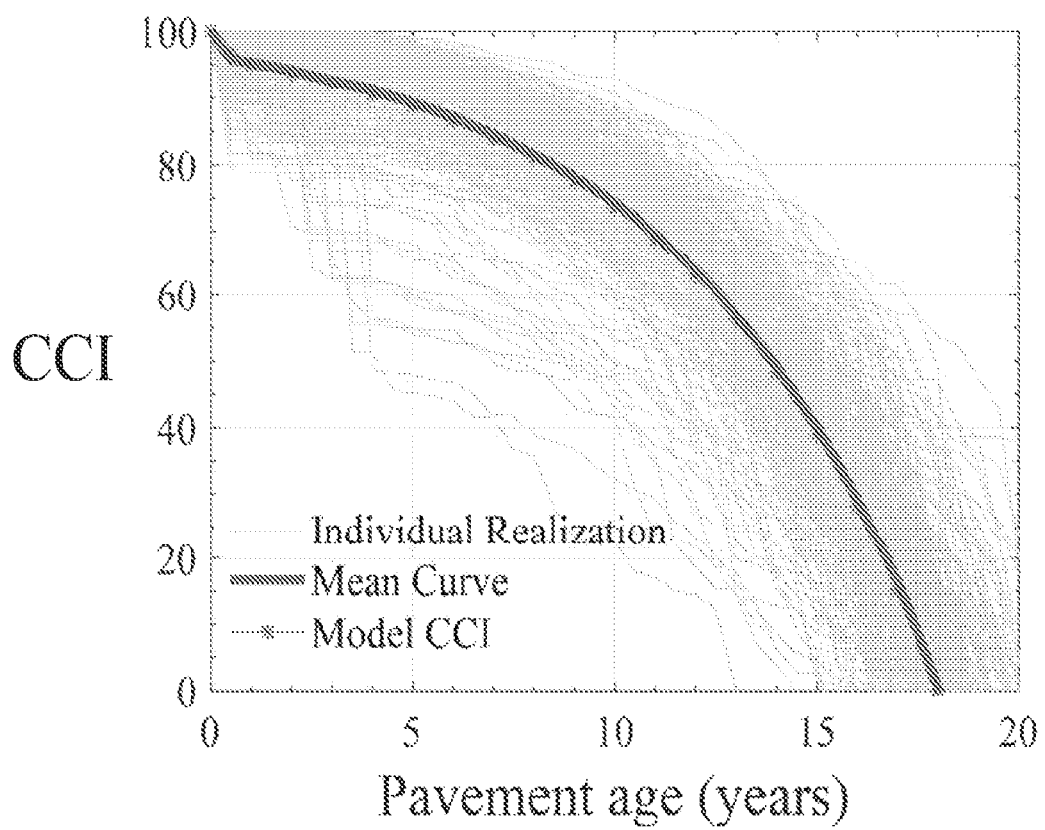
FIG. 8 is a graph illustrating simulation results from utilization of a first exemplary embodiment of a communication apparatus that was adapted to utilize an exemplary embodiment of a prioritization and scheduling process.

Due to their monotonicity, gamma processes are readily used as a suitable modeling choice in stochastic deterioration engineering applications and can describe continuous Markovian transitions. For time instant $t_1 < t_2$, the increment of DI follows a gamma distribution:

$$DI(t_2)-DI(t_1) \sim Ga(\cdot|f(t_2)-f(t_1), g(t_2)) \quad \text{(Eq. 20)}$$

where, $g(t)$ is assumed to be constant in the interval $t_1, t_2$. In FIG. 8, relevant simulation results are indicatively shown for the heavier traffic level (A) in this Example, with 300 different realizations. The solid line represents the mean CCI and the red curve is the mean CCI model prediction based on the gamma process. All corresponding $f(t)$ and $g(t)$ values are shown in Table 1, for all different traffic levels (A-E, E being the lowest traffic level).

TABLE 1

Variables f(t) and g(t) gamma process parameters for calculating CCI parameters.

| Time (years) | Traffic level (A) | | Traffic level (B) | | Traffic level (C) | | Traffic level (D) | | Traffic level (E) | |
|---|---|---|---|---|---|---|---|---|---|---|
| | f(t) | g(t) | f(t) | g(t) | f(t) | g(t) | f(t) | g(t) | f(t) | g(t) |
| 1 | 0.922 | 0.178 | 1.217 | 0.280 | 1.394 | 0.349 | 1.560 | 0.420 | 1.679 | 0.473 |
| 2 | 0.649 | 0.101 | 0.857 | 0.158 | 0.981 | 0.197 | 1.098 | 0.237 | 1.182 | 0.267 |
| 3 | 0.475 | 0.061 | 0.628 | 0.096 | 0.718 | 0.119 | 0.804 | 0.143 | 0.866 | 0.161 |
| 4 | 0.354 | 0.038 | 0.467 | 0.059 | 0.535 | 0.074 | 0.599 | 0.089 | 0.644 | 0.100 |
| 5 | 12.759 | 1.135 | 12.759 | 1.350 | 12.759 | 1.469 | 12.759 | 1.577 | 12.759 | 1.651 |
| 6 | 12.759 | 0.952 | 12.759 | 1.133 | 12.759 | 1.233 | 12.759 | 1.323 | 12.759 | 1.386 |
| 7 | 12.759 | 0.801 | 12.759 | 0.953 | 12.759 | 1.037 | 12.759 | 1.113 | 12.759 | 1.166 |
| 8 | 12.759 | 0.675 | 12.759 | 0.804 | 12.759 | 0.874 | 12.759 | 0.938 | 12.759 | 0.982 |
| 9 | 12.759 | 0.570 | 12.759 | 0.678 | 12.759 | 0.738 | 12.759 | 0.792 | 12.759 | 0.829 |
| 10 | 12.759 | 0.481 | 12.759 | 0.573 | 12.759 | 0.623 | 12.759 | 0.669 | 12.759 | 0.700 |
| 11 | 12.759 | 0.407 | 12.759 | 0.484 | 12.759 | 0.527 | 12.759 | 0.566 | 12.759 | 0.592 |
| 12 | 12.759 | 0.344 | 12.759 | 0.410 | 12.759 | 0.446 | 12.759 | 0.479 | 12.759 | 0.501 |
| 13 | 12.759 | 0.292 | 12.759 | 0.347 | 12.759 | 0.378 | 12.759 | 0.405 | 12.759 | 0.424 |
| 14 | 12.759 | 0.247 | 12.759 | 0.294 | 12.759 | 0.320 | 12.759 | 0.343 | 12.759 | 0.359 |
| 15 | 12.759 | 0.209 | 12.759 | 0.249 | 12.759 | 0.271 | 12.759 | 0.291 | 12.759 | 0.305 |
| 16 | 12.759 | 0.177 | 12.759 | 0.211 | 12.759 | 0.230 | 12.759 | 0.247 | 12.759 | 0.258 |
| 17 | 12.759 | 0.151 | 12.759 | 0.179 | 12.759 | 0.195 | 12.759 | 0.209 | 12.759 | 0.219 |
| 18 | 12.759 | 0.128 | 12.759 | 0.152 | 12.759 | 0.165 | 12.759 | 0.177 | 12.759 | 0.186 |
| 19 | 12.759 | 0.108 | 12.759 | 0.129 | 12.759 | 0.140 | 12.759 | 0.151 | 12.759 | 0.158 |
| 20 | 12.759 | 0.092 | 12.759 | 0.109 | 12.759 | 0.119 | 12.759 | 0.128 | 12.759 | 0.134 |

To determine the transition probabilities, the CCI values were discretized into 6 condition states, with 6 being the intact state, as shown in Table 2. These discretized condition states were adapted from prescribed VDOT maintenance guidelines. Further, 4 maintenance actions are adopted (Do-Nothing, Minor Repair, Major Repair, Reconstruction). There are various guidelines for pavement maintenance action from different agencies. The maintenance actions used in this example, represent category of actions, i.e., Minor Repair includes crack filling, moderate patching, etc., these actions can improve the CCI and IRI states but do not affect the rate of deterioration. Major Repair includes heavy patching, full depth patching, milling and overlay, etc., and can improve condition states and reduce the deterioration rate by 5 years. Reconstruction actions can reset the pavement to an intact condition. Maintenance actions taken at any given time can simultaneously improve both CCI and IRI indices. Table 18 provides examples of activities for these actions.

Figure 9:
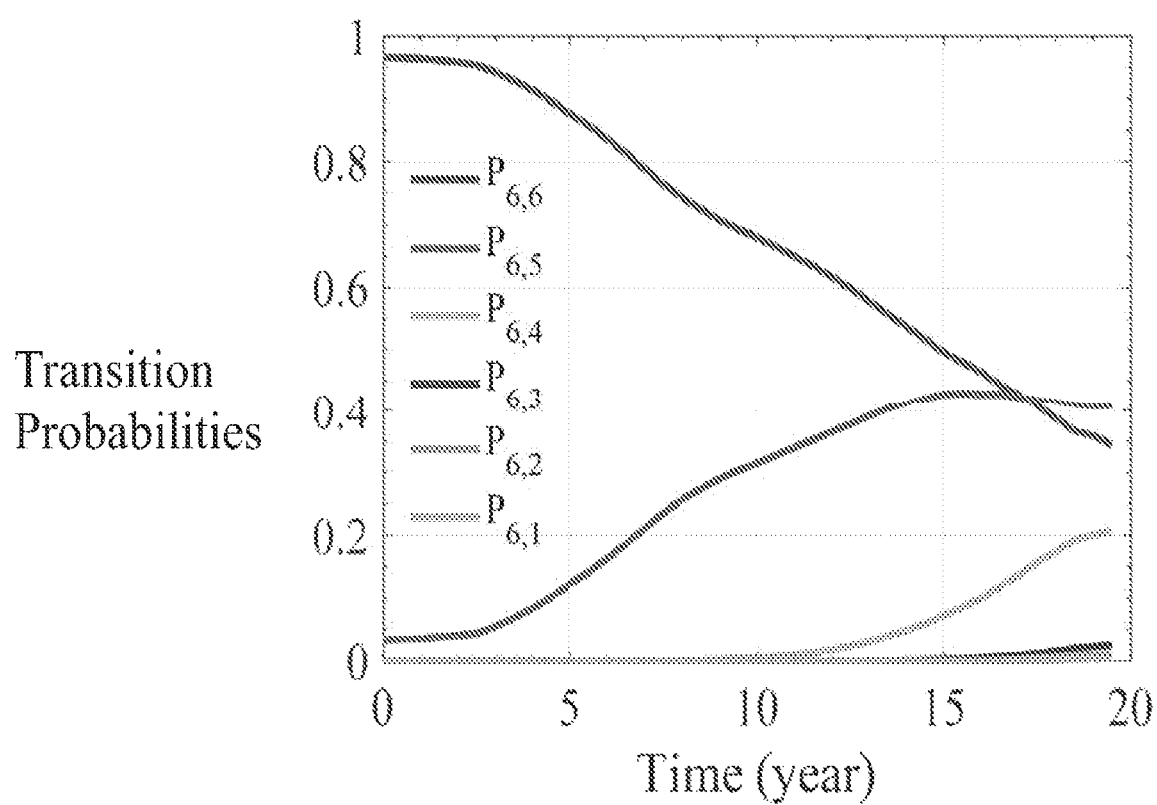
FIG. 9 is a graph illustrating computed transition probabilities for pavements supporting the heavier traffic loads in the Example described subsequently, generated from utilization of a first exemplary embodiment of a communication apparatus that was adapted to utilize an exemplary embodiment of a prioritization and scheduling process.

For Do-Nothing action, $10^6$ sequences were generated in total to obtain the transition probabilities for a given traffic level. FIG. 9 indicatively shows the computed transition probabilities for the heavier traffic level. Tables 3-5 identify Minor Repair, Major Repair and Reconstruction transition probabilities for the 6 CCI states.

TABLE 2

State discretization based on CCI values.

| CCI state (s) | CCI values | Pavement Condition |
|---|---|---|
| s = 6 | 100-90 | Excellent |
| s = 5 | 89-80 | Very Good |
| s = 4 | 79-61 | Good |
| s = 3 | 60-50 | Fair |
| s = 2 | 49-37 | Poor |
| s = 1 | <37 | Very Poor |

TABLE 3

Minor Repair transition probabilities for 6 CCI states.

| Condition State | $s_{t+1} = 6$ | $s_{t+1} = 5$ | $s_{t+1} = 4$ | $s_{t+1} = 3$ | $s_{t+1} = 2$ | $s_{t+1} = 1$ |
|---|---|---|---|---|---|---|
| $s_t = 6$ | 0.97 | 0.03 | 0.00 | | | |
| $s_t = 5$ | 0.87 | 0.10 | 0.03 | | | |
| $s_t = 4$ | 0.40 | 0.47 | 0.10 | 0.03 | | |
| $s_t = 3$ | | 0.40 | 0.47 | 0.10 | 0.03 | |
| $s_t = 2$ | | | 0.40 | 0.47 | 0.10 | 0.03 |
| $s_t = 1$ | | | | 0.40 | 0.47 | 0.13 |
| Deterioration rate | | | Does not change | | | |

TABLE 4

Major Repair transition probabilities for 6 CCI states.

| Condition State | $s_{t+1} = 6$ | $s_{t+1} = 5$ | $s_{t+1} = 4$ | $s_{t+1} = 3$ | $s_{t+1} = 2$ | $s_{t+1} = 1$ |
|---|---|---|---|---|---|---|
| $s_t = 6$ | 1.00 | 0.00 | 0.00 | | | |
| $s_t = 5$ | 0.96 | 0.04 | 0.00 | | | |
| $s_t = 4$ | 0.80 | 0.20 | 0.00 | | | |
| $s_t = 3$ | 0.65 | 0.25 | 0.10 | | | |
| $s_t = 2$ | 0.50 | 0.30 | 0.20 | | | |
| $s_t = 1$ | 0.40 | 0.30 | 0.30 | | | |
| Deterioration rate | | | Reset by 5 years | | | |

TABLE 5

Reconstruction transition probabilities for 6 CCI states.

| Condition state | $s_{t+1} = 6$ | $s_{t+1} = 5$ | $s_{t+1} = 4$ | $s_{t+1} = 3$ | $s_{t+1} = 2$ | $s_{t+1} = 1$ |
|---|---|---|---|---|---|---|
| $s_t = 6$ | 1.00 | 0.00 | 0.00 | | | |
| $s_t = 5$ | 1.00 | 0.00 | 0.00 | | | |
| $s_t = 4$ | 1.00 | 0.00 | 0.00 | | | |
| $s_t = 3$ | 1.00 | 0.00 | 0.00 | | | |
| $s_t = 2$ | 1.00 | 0.00 | 0.00 | | | |
| $s_t = 1$ | 1.00 | 0.00 | 0.00 | | | |
| Deterioration rate | | | Reset to new pavement section | | | |

The observation uncertainty for CCI is modeled by the likelihood functions $\rho(o_t|s_t)$, which quantified the probability of receiving an observation $o$ at time t given a state $s_t$. Three distributions are considered in this embodiment to function as a likelihood function, corresponding to no-inspection, low- and high-fidelity inspections, respectively. Tables 6 and 7 below provide observational probabilities for given CCI states corresponding to the three cases used in this Example. For this embodiment, the IRI (in m/km) was discretized into 5 states, with 5 being the intact state. Unlike CCI, the IRI transition probability model is stationary. In this case too, three different inspection activities were assumed, and the measurement errors associated with the respective inspection technologies were also considered according to no-inspection, low-, and high-fidelity inspection cases.

TABLE 6

Observation probability $p(o_t|s_t)$ given actual state $s_t$, with low fidelity inspection.

| Actual state | $p(o_t = 6|s_t)$ | $p(o_t = 5|s_t)$ | $p(o_t = 4|s_t)$ | $p(o_t = 3|s_t)$ | $p(o_t = 2|s_t)$ | $p(o_t = 1|s_t)$ |
|---|---|---|---|---|---|---|
| $s_t = 6$ | 0.687 | 0.259 | 0.054 | 0.000 | 0.000 | 0.000 |
| $s_t = 5$ | 0.276 | 0.422 | 0.297 | 0.005 | 0.000 | 0.000 |
| $s_t = 4$ | 0.023 | 0.139 | 0.648 | 0.167 | 0.022 | 0.001 |
| $s_t = 3$ | 0.000 | 0.003 | 0.266 | 0.455 | 0.248 | 0.028 |
| $s_t = 2$ | 0.000 | 0.000 | 0.031 | 0.224 | 0.486 | 0.259 |
| $s_t = 1$ | 0.000 | 0.000 | 0.000 | 0.005 | 0.059 | 0.936 |

TABLE 7

Observation probability $p(o_t|s_t)$ given actual state $s_t$, with high fidelity inspection.

| Actual state | $p(o_t = 6\|s_t)$ | $p(o_t = 5\|s_t)$ | $p(o_t = 4\|s_t)$ | $p(o_t = 3\|s_t)$ | $p(o_t = 2\|s_t)$ | $p(o_t = 1\|s_t)$ |
|---|---|---|---|---|---|---|
| $s_t = 6$ | 0.801 | 0.197 | 0.002 | 0.000 | 0.000 | 0.000 |
| $s_t = 5$ | 0.153 | 0.664 | 0.183 | 0.000 | 0.000 | 0.000 |
| $s_t = 4$ | 0.001 | 0.078 | 0.822 | 0.099 | 0.000 | 0.000 |
| $s_t = 3$ | 0.000 | 0.000 | 0.149 | 0.693 | 0.158 | 0.000 |
| $s_t = 2$ | 0.000 | 0.000 | 0.001 | 0.137 | 0.718 | 0.144 |
| $s_t = 1$ | 0.000 | 0.000 | 0.000 | 0.000 | 0.042 | 0.958 |

Tables 8-11 below provide the Do-Nothing, Minor Repair, Major Repair, and Reconstruction transition probabilities, respectively, for the 5 IRI states in this example. Further, the observation probabilities for different inspections technique based on their fidelity levels are shown in Table 12.

TABLE 8

Do-Nothing transition probabilities for 5 IRI states.

| Condition State | $s_{t+1} = 5$ | $s_{t+1} = 4$ | $s_{t+1} = 3$ | $s_{t+1} = 2$ | $s_{t+1} = 1$ |
|---|---|---|---|---|---|
| $s_t = 5$ | 0.840 | 0.121 | 0.039 | | |
| $s_t = 4$ | | 0.788 | 0.142 | 0.070 | |
| $s_t = 3$ | | | 0.708 | 0.192 | 0.01 |
| $s_t = 2$ | | | | 0.578 | 0.422 |
| $s_t = 1$ | | | | | 1.000 |

TABLE 9

Minor Repair transition probabilities for 5 IRI states.

| Condition State | $s_{t+1} = 5$ | $s_{t+1} = 4$ | $s_{t+1} = 3$ | $s_{t+1} = 2$ | $s_{t+1} = 1$ |
|---|---|---|---|---|---|
| $s_t = 5$ | 0.97 | 0.03 | 0.00 | | |
| $s_t = 4$ | 0.85 | 0.12 | 0.03 | | |
| $s_t = 3$ | 0.45 | 0.40 | 0.12 | 0.03 | |
| $s_t = 2$ | | 0.45 | 0.40 | 0.12 | 0.03 |
| $s_t = 1$ | | | 0.45 | 0.40 | 0.15 |

TABLE 10

Major Repair transition probabilities for 5 IRI states.

| Condition State | $s_{t+1} = 5$ | $s_{t+1} = 4$ | $s_{t+1} = 3$ | $s_{t+1} = 2$ | $s_{t+1} = 1$ |
|---|---|---|---|---|---|
| $s_t = 5$ | 1.00 | 0.00 | 0.00 | | |
| $s_t = 4$ | 0.95 | 0.05 | 0.00 | | |
| $s_t = 3$ | 0.80 | 0.20 | 0.00 | | |
| $s_t = 2$ | 0.70 | 0.25 | 0.05 | | |
| $s_t = 1$ | 0.45 | 0.35 | 0.20 | | |

TABLE 11

Reconstruction transition probabilities for 5 IRI states.

| Condition State | $s_{t+1} = 5$ | $s_{t+1} = 4$ | $s_{t+1} = 3$ | $s_{t+1} = 2$ | $s_{t+1} = 1$ |
|---|---|---|---|---|---|
| $s_t = 5$ | 1.00 | 0.00 | 0.00 | | |
| $s_t = 4$ | 1.00 | 0.00 | 0.00 | | |
| $s_t = 3$ | 1.00 | 0.00 | 0.00 | | |
| $s_t = 2$ | 1.00 | 0.00 | 0.00 | | |
| $s_t = 1$ | 1.00 | 0.00 | 0.00 | | |

TABLE 12

Observation probability $p(o_t|s_t)$ for IRI given state $s_t$.

| Inspection Technique | Fidelity-level | $P(o_t = j-2\| s_t = j)$ | $P(o_t = j-1\| s_t = j)$ | $P(o_t = j\| s_t = j)$ | $P(o_t = j+1\| s_t = j)$ | $P(o_t = j+2\| s_t = j)$ | Cost (USD/m$^2$) |
|---|---|---|---|---|---|---|---|
| $i_2$ | high-fidelity | 0 | 0.05 | 0.90 | 0.05 | 0 | 0.10 |
| $i_1$ | low fidelity | 0 | 0.20 | 0.60 | 0.20 | 0 | 0.03 |
| $i_0$ | no-inspection | 0.20 | 0.20 | 0.20 | 0.20 | 0.20 | 0 |

Figure 10:
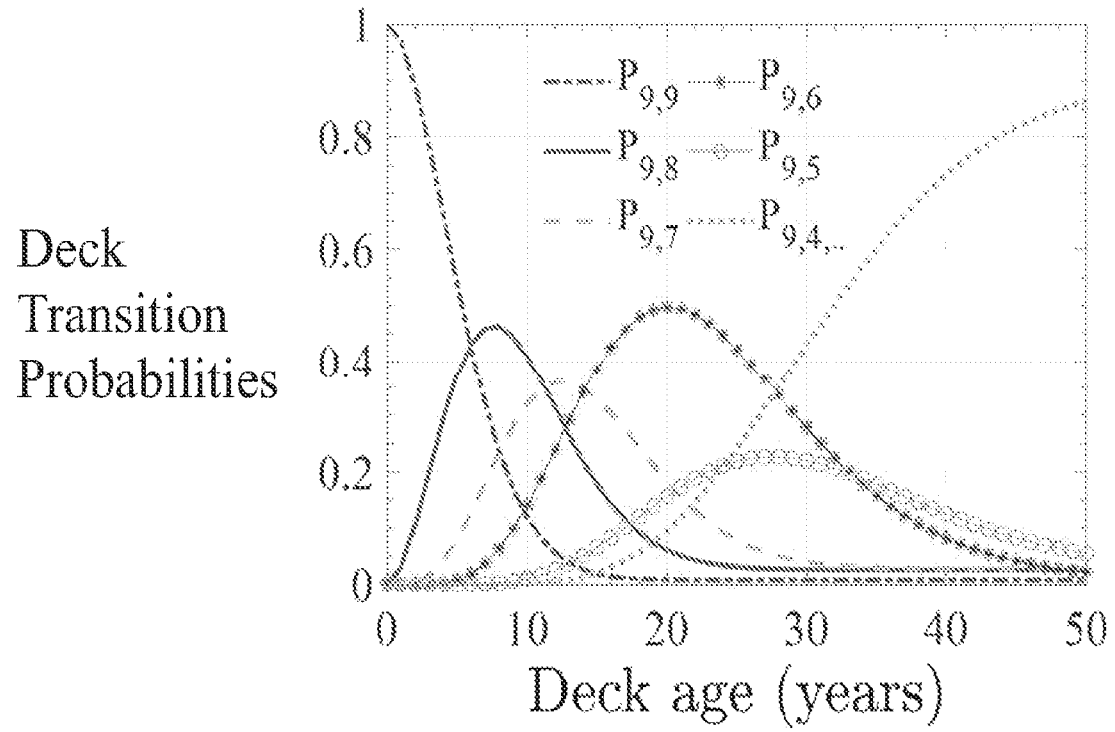
FIG. 10 is a graph illustrating deck transition probabilities.

For the objectives of this example, only the decks of bridges were considered instead of all three bridge components (decks, sub- and super-structures), as the decks have the highest deterioration rate, are expensive to repair, and are directly influenced by traffic. To determine the serviceability of decks, 9 General Condition Ratings (GCR) as condition states are generally considered, with GCR 9 being the undamaged state, as per the convention adopted by Penn-DOT and several other DOTs. In this example, state 4 characterizes all subsequent states. Thus, 6 bridge deck states along with a failure state are used. The nonstationary transition probabilities were based on 30 years of in-service performance data for more than 22,000 bridges in Pennsylvania, as illustrated in FIG. 10. Apart from these 6 nonstationary transitions, stationary failure probabilities are also considered, where a bridge was assumed to have a failure probability of $P_f=0.001$ if it is in states 9 and 8, and $P_f=0.005$ if it is in states 7, 6, and 5. $P_f$ finally reaches 0.01 if the bridge state is 4.

Similar to pavements, four maintenance actions are considered for maintaining the bridge decks, i.e., Do-Nothing, Minor Repair, Major Repair, and Reconstruction. However, the involved performed actions are different. It was again assumed that the Minor Repair action does not change the rate of deterioration of the deck but it can improve the condition state of the structure. Similarly, Major Repair can improve both, and Reconstruction can reset the deck to a newly built one. Tables 13-15 provide the transition probabilities for Minor Repair, Major Repair, and Reconstruction, respectively.

TABLE 14

Major Repair transition probabilities for deck states.

| Condition State | $s_{t+1}=$ 9 | $s_{t+1}=$ 8 | $s_{t+1}=$ 7 | $s_{t+1}=$ 6 | $s_{t+1}=$ 5 | $s_{t+1}=$ 4, ... | $s_{t+1}=$ failed |
|---|---|---|---|---|---|---|---|
| $s_t=9$ | 1.00 | 0.00 | 0.00 | | | | |
| $s_t=8$ | 0.95 | 0.05 | 0.00 | | | | |
| $s_t=7$ | 0.80 | 0.20 | 0.00 | | | | |
| $s_t=6$ | 0.60 | 0.30 | 0.10 | | | | |
| $s_t=5$ | 0.40 | 0.40 | 0.20 | | | | |
| $s_t=4,...$ | 0.30 | 0.40 | 0.30 | | | | |
| $s_t=$ failed | | | | | | | 1.0 |
| Deterioration rate | | | Reset by 5 years | | | | |

TABLE 15

Reconstruction transition probabilities for deck states.

| Condition State | $s_{t+1}=$ 9 | $s_{t+1}=$ 8 | $s_{t+1}=$ 7 | $s_{t+1}=$ 6 | $s_{t+1}=$ 5 | $s_{t+1}=$ 4 | $s_{t+1}=$ failed |
|---|---|---|---|---|---|---|---|
| $s_t=9$ | 1.00 | 0.00 | 0.00 | | | | |
| $s_t=8$ | 1.00 | 0.00 | 0.00 | | | | |
| $s_t=7$ | 1.00 | 0.00 | 0.00 | | | | |
| $s_t=6$ | 1.00 | 0.00 | 0.00 | | | | |
| $s_t=5$ | 1.00 | 0.00 | 0.00 | | | | |
| $s_t=4,...$ | 1.00 | 0.00 | 0.00 | | | | |
| $s_t=$ failed | 1.00 | 0.00 | 0.00 | | | | |
| Deterioration rate | | | Reset to newly built deck | | | | |

TABLE 16

Observation probability $p(o_t|s_t)$ given state $s_t$, for low-fidelity inspection techniques for decks.

| Actual state ($s_t$) | $p(o_t=$ 9$\vert s_t)$ | $p(o_t=$ 8$\vert s_t)$ | $p(o_t=$ 7$\vert s_t)$ | $p(o_t=$ 6$\vert s_t)$ | $p(o_t=$ 5$\vert s_t)$ | $p(o_t=$ 4,...$\vert s_t)$ | $p(o_t=$ failed$\vert s_t)$ |
|---|---|---|---|---|---|---|---|
| $s_t=9$ | 0.80 | 0.15 | 0.05 | | | | |
| $s_t=8$ | 0.15 | 0.65 | 0.15 | 0.05 | | | |
| $s_t=7$ | 0.05 | 0.15 | 0.60 | 0.15 | 0.05 | 0.0 | |
| $s_t=6$ | | 0.05 | 0.15 | 0.60 | 0.15 | 0.05 | |
| $s_t=5$ | | | 0.05 | 0.15 | 0.65 | 0.15 | |
| $s_t=4,...$ | | | | 0.05 | 0.15 | 0.80 | |
| $s_t=$ failed | | | | | | | 1.0 |

TABLE 13

Minor Repair transition probabilities for deck states.

| Condition State | $s_{t+1}=$ 9 | $s_{t+1}=$ 8 | $s_{t+1}=$ 7 | $s_{t+1}=$ 6 | $s_{t+1}=$ 5 | $s_{t+1}=$ 4, ... | $s_{t+1}=$ failed |
|---|---|---|---|---|---|---|---|
| $s_t=9$ | 0.97 | 0.03 | 0.00 | | | | |
| $s_t=8$ | 0.85 | 0.12 | 0.03 | | | | |
| $s_t=7$ | 0.40 | 0.45 | 0.12 | 0.03 | | | |
| $s_t=6$ | | 0.40 | 0.45 | 0.12 | 0.03 | | |
| $s_t=5$ | | | 0.40 | 0.45 | 0.12 | 0.03 | |
| $s_t=4,...$ | | | | 0.40 | 0.45 | 0.15 | |
| $s_t=$ failed | | | | | | | 1.0 |
| Deterioration rate | | | Does not change | | | | |

TABLE 17

Observation probability $p(o_t|s_t)$ given state $s_t$, for high fidelity inspection techniques for decks.

| Actual state ($s_t$) | $p(o_t = 9\|s_t)$ | $p(o_t = 8\|s_t)$ | $p(o_t = 7\|s_t)$ | $p(o_t = 6\|s_t)$ | $p(o_t = 5\|s_t)$ | $p(o_t = 4,\ldots \|s_t)$ | $p(o_t = \text{failed}\|s_t)$ |
|---|---|---|---|---|---|---|---|
| $s_t = 9$ | 0.90 | 0.10 | | | | | |
| $s_t = 8$ | 0.10 | 0.80 | 0.10 | | | | |
| $s_t = 7$ | | 0.10 | 0.80 | 0.10 | | | |
| $s_t = 6$ | | | 0.10 | 0.80 | 0.10 | | |
| $s_t = 5$ | | | | 0.10 | 0.80 | 0.10 | |
| $s_t = 4,\ldots$ | | | | | 0.10 | 0.90 | |
| $s_t = \text{failed}$ | | | | | | | 1.0 |

For deck inspections, there is a variety of destructive and nondestructive inspection techniques that can be used for bridge decks, such as visual inspections, acoustic sensing, infrared/thermal imaging, ground penetrating radar, coring and chipping, and half-cell potential tests, among many others. Towards generality, inspection techniques are herein characterized as uninformative, low-fidelity, and high-fidelity inspection techniques, respectively, similar to the pavements. Tables 16 and 17 provide observation probabilities for low- and high-fidelity inspection techniques for decks, respectively.

TABLE 18

Maintenance activities for interstate and primary pavements under different categories.

| Activity Category | Activities |
|---|---|
| Do Nothing (DN) | N/A |
| Routine Maintenance (PM) | 1. Minor Patching (<5% of Pavement Area; Surface Patching; Depth 2") |
| | 2. Crack Sealing |
| | 3. Thin Treatments (Chip Seal, Slurry Seal, Latex, Thin Hotmix Asphalt Concrete (THMACO), 'Novachip' etc.) |
| Corrective Maintenance (CM) | 1. Moderate Patching (<10% of Pavement Area; Partial Depth Patching; Depth 4"-6") |
| | 2. Partial Depth Patching (<10% of Pavement Area; Depth 4"-6") and Surface Treatment |
| | 3. Partial Depth Patching (<10% of Pavement Area; Depth 4"-6") and Thin (≤2") AC Overlay |
| | 4. ≤2" Milling and ≤2" AC Overlay |
| Restorative Maintenance (RM) | 1. Heavy Patching (<20% of Pavement Area; Full Depth Patching; Depth 12") |
| | 2. ≤4" Milling and Replace with ≤4" AC Overlay |
| | 3. Full Depth Patching (<20% of Pavement Area; Full Depth Patching; Depth 9"-12") and 4" AC Overlay |
| | 4. Cold In Place Recycling |
| Rehabilitation/Reconstruction (RC) | 1. Mill, Break and Seat and 9"-12" AC Overlay |
| | 2. Reconstruction |
| | 3. Full Depth Reclamation |

Tables 19 and 20 below provide the maintenance actions durations in days for pavement and bridge components respectively, to use in this example.

TABLE 19

Pavement maintenance action durations in days per lane mile.

| Actions | Days per lane mile | Additional days per mile for shoulder, etc. |
|---|---|---|
| Do Nothing | 0 | 0 |
| Minor Repair | 3.5 | 1 |
| Major Repair | 6.5 | 2 |
| Reconstruction | 32 | 10 |

TABLE 20

Deck maintenance action durations in days.

| Actions | Type I Bridges | Type II Bridges | Type III Bridges |
|---|---|---|---|
| Do Nothing | 0 | 0 | 0 |
| Minor Repair | 25 | 12 | 6 |
| Major Repair | 70 | 30 | 15 |
| Reconstruction | 300 | 150 | 70 |

As already mentioned, the Hampton Roads transportation network in Virginia, USA, is considered as a reference example, which includes original topology and average daily traffic data of the network. The topology includes various pavement sections along with 11 main bridges. Each bridge is bidirectional, with the same number of lanes as in the original network, illustrated in FIG. 11. Different decks, types I-III, are categorized based on their relative sizes and traffic consideration in descending order. Type I bridges are large bridges typically having a length of more than 2 miles with the highest volume of traffic; type II bridges range between 0.4-2 miles with intermediate traffic volume; and type III bridges usually have lengths less than 0.4 miles and have the lowest traffic volume as shown in Table 21. An exception to this classification is the Great Bridge bypass, which should be of type II based on the size, but as it is on a secondary highway with no nearby interstates or high traffic volume highway, it is categorized as type III. Even though we have different traffic volumes for different types of bridges mainly due to their sizes, the volume per lane-mile is considered the same as these bridges are essential and lie on the interstate or primary highway routes. Further, we also determine the user delay costs associated with maintenance actions using bridge size and traffic flow.

Similarly, the network has 85 pavement components categorized as type I-III. Type I pavements are interstate highways, with bidirectional traffic having four lanes in each direction, constituting the class of highest vehicular miles. Type II are primary highways with a bidirectional medium level of traffic, having two lanes in each direction. Lastly, type III are secondary highways with low-level bidirectional traffic and one lane in each direction. The deterioration rate of pavements is selected based on these classes, as high-volume roads have a higher rate than low-volume ones in this example.

Risk is defined as an expected cumulative discounted failure state cost over the life cycle. The risk cost can include multiple parts: (1) accruable cost, which is taken as two times the rebuilding cost of the bridge, and (2) instantaneous cost, which is considered here as ten times the rebuilding cost of the bridge. The total risk is estimated using (i) the risk of individual bridge failures (for all network bridges), and (ii) the system-level risk, defined based on the connecting bridges over James River and York River. The system risk has 3 failure modes, i.e., (A) the bridge over York River fails, (B) the 3 bridges over James River fail, and (C) modes A and B occur simultaneously.

TABLE 21

Bridge geometric information

| S. no. | Names | Start Node | End Node | Length (miles) | Number of lanes |
|---|---|---|---|---|---|
| 1 | James River (type I) | 18 | 21 | 4.42 | 4 |
| 2 | MMM bridge (type I) | 19 | 68 | 4.63 | 4 |
| 3 | Hampton roads bridge tunnel (type I) | 20 | 63 | 3.5 | 4 |
| 4 | Coleman memorial bridge (type II) | 5 | 6 | 0.71 | 4 |
| 5 | Bridge Road (type II) | 21 | 69 | 0.71 | 2 |
| 6 | High rise bridge (type II) | 49 | 50 | 0.94 | 4 |
| 7 | Berkley bridge (type II) | 49 | 66 | 0.40 | 8 |
| 8 | Gilmerton bridge (type II) | 50 | 62 | 0.42 | 4 |
| 9 | W Norfolk bridge (type II) | 66 | 69 | 0.63 | 4 |
| 10 | Bridge on Nansemond River Suffolk (type III) | 31 | 45 | 0.2 | 4 |
| 11 | Great bridge bypass (type III) | 53 | 54 | 0.56 | 4 |

There are various constraints that are considered, based on the condition states of pavements and bridges (e.g., constraints imposed by the federal highway agencies and VDOT agencies etc.). For National Highway System (NHS) bridges, no more than 10% of the total bridge deck area should be deficient (i.e., condition rating ≤4), and for NETS pavements, no more than 10% of lane-miles should be in poor condition (i.e., CCI<60 and IRI>2.2 m/km). Based on VDOT targets, no more than 1800 of interstate and primary pavements and 35% of secondary pavements should be classified as deficient (i.e., CCI<60). Regarding serviceability, no more than 15% of interstate and primary roadways should be classified as deficient in terms of ride quality (i.e., IRI>2.2 m/km). VDOT also aims to achieve 'no' CCI lower than 35 for the interstate system. The above constraints can be defined to be satisfied in an expectation sense (i.e., probabilistic constraints). Therefore, the last constraint can be modified here from 0 to 2%.

Finally, a budget constraint was imposed due to limited available resources. A five-year budget of $1.3 billion was allocated to Hampton Roads districts for 2021-2026. This budget was set as a deterministic constraint as it had to be complied with and was implemented as an augmented state of the network.

Figure 11:
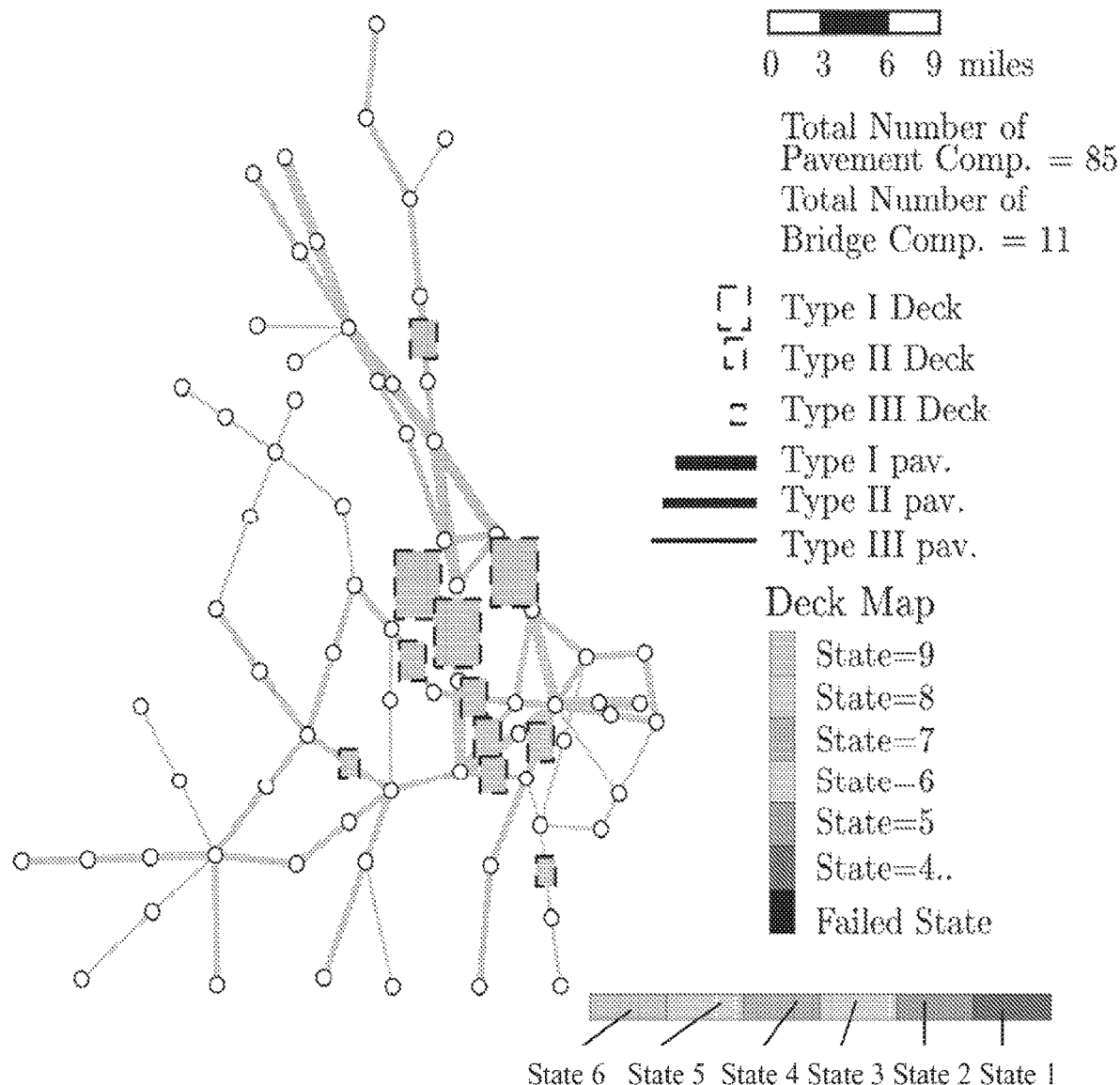
FIG. 11 depicts an exemplary model for an exemplary set of roadways and bridges.

When employed, the embodiment of this example evaluated a 96-component network based on the Hampton Road network shown in FIG. 11, which had a total number of $\sim 2 \times 10^{248}$ possible system states at any given time instant. 10 actions per component were considered which make the total number of available actions equal to $10^{96}$ for the entire network at each time step. The network components started from intact state, with an episode length of 20 years, and a discount factor $\gamma=0.97$. The network algorithm training was performed for $1.3 \times 10^6$ episodes.

To evaluate solutions generated by utilization of our embodiments in this example, we formulate and evaluated 2 baselines, i.e., (i) a condition-based maintenance (CBM) policy, and (ii) a policy baseline following VDOT guidelines. The CBM policy is heuristically optimized to find the relevant thresholds based on the condition of each component type, i.e., bridge, interstate, primary, and secondary pavements. The policy involves the full suite of 10 actions at every even time step. However, at every odd year, action 6 is taken for every component, i.e., Do-Nothing and high-fidelity-inspection. The VDOT policy baseline was approximated from a VDOT 2016 publication for pavement components. The original VDOT policy used CCI and other distress metrics for action selection, but here only CCI was used. For bridge decks, the same criterion was used as for interstate components due to their similar importance.

Figure 12:
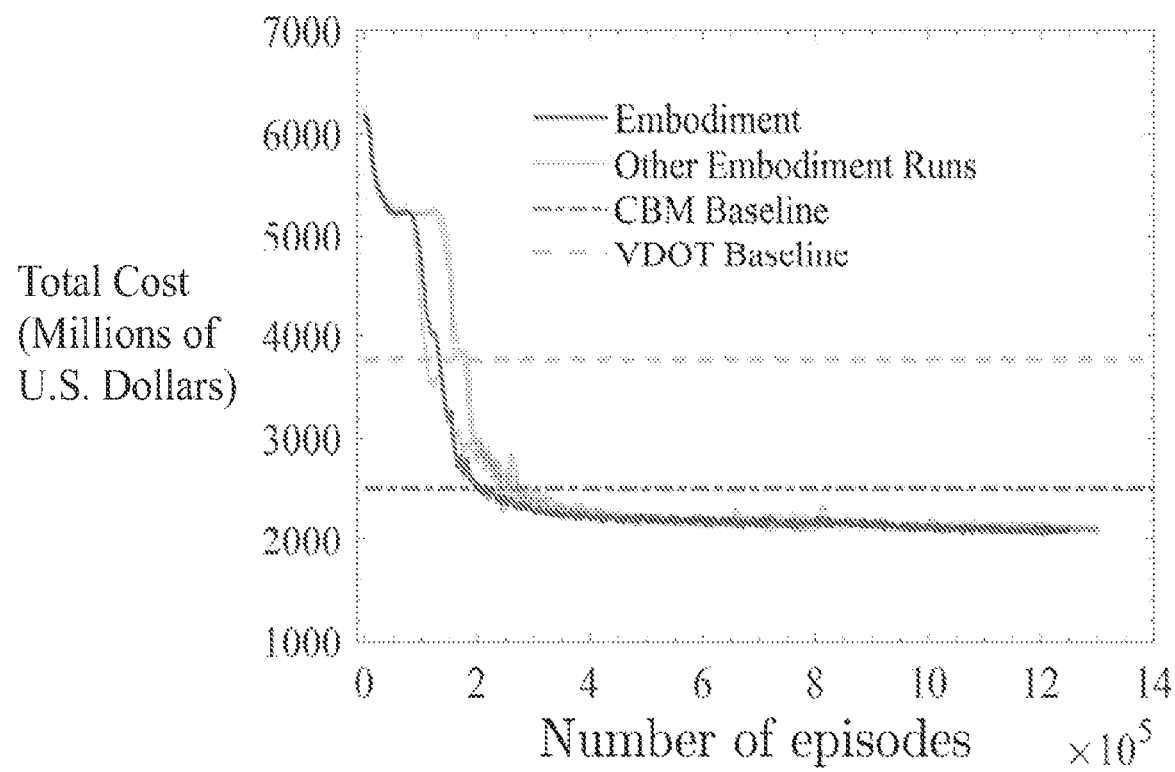
FIG. 12 is a graph illustrating a comparison of cost projections to compare baseline results with results obtained via use of an exemplary embodiment.
Figure 13:
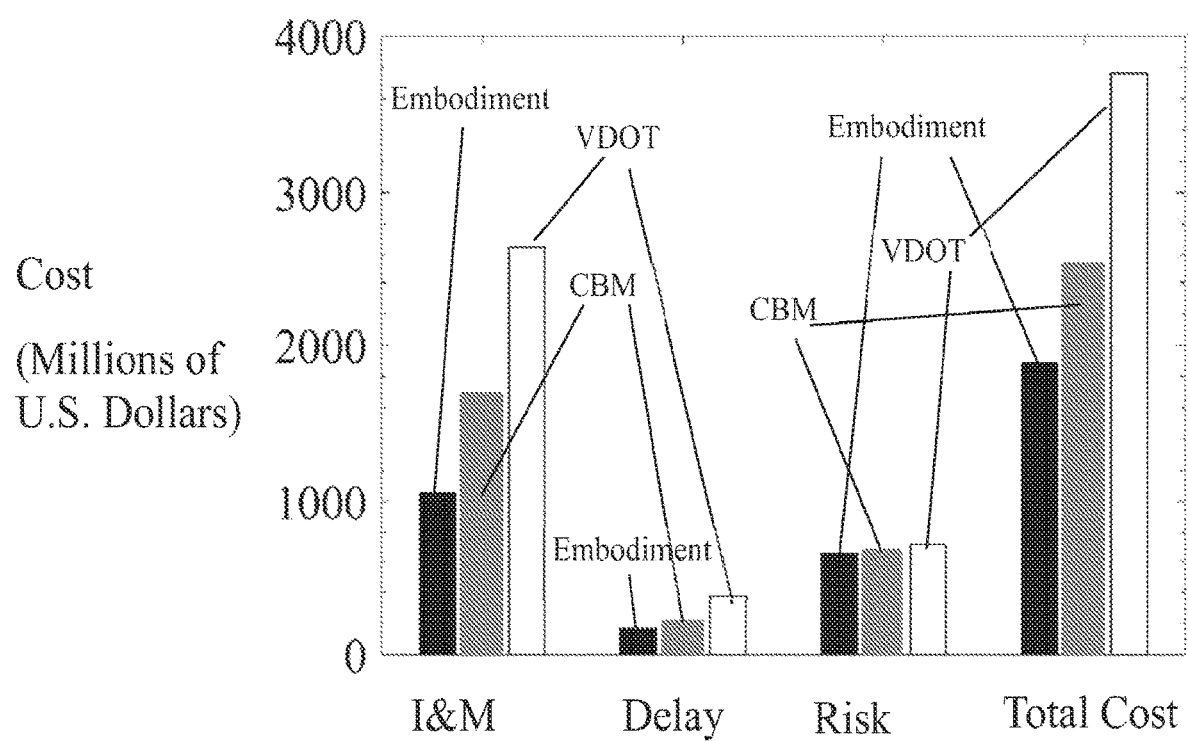
FIG. 13 is a histogram illustrating a comparison of different cost constituents to compare baseline results with results obtained via use of an exemplary embodiment.

The expected total costs during training are compared in FIG. 12. FIG. 13 also presents a histogram comparing the total costs with their constituents based on Monte-Carlo simulations. It can be observed that our embodiment provides results that surpassed both baselines during training and simulation by a significant margin, being 27% cheaper than the CBM policy and 48% cheaper than the VDOT policy, as given in Table 22. Table 22 also compares the average performance over $10^4$ simulations in terms of poor condition states, as per the 6 different constraints discussed above. The performance constraints are in the rows of the table, and I, P, and S Hwy are the abbreviations of interstate, primary, and secondary highways, respectively.

TABLE 22

Comparison of different solution schemes in terms of total cost and performance with respect to average condition states of different pavement and bridge components.

| Objective & Constraints | DDMAC-CTDE | CBM policy | VDOT policy |
|---|---|---|---|
| Total budget used (billion USD) | 1.86 | 2.54 | 3.62 |
| CCI < 60 and IRI > 2.2 m/km for I-Hwy (%) | 2.0 | 2.9 | 0.0 |
| CCI < 35 of I-Hwy (%) | 1.9 | 0.5 | 0.0 |
| CCI < 60 for I and P-Hwy (%) | 7.3 | 4.7 | 0.1 |
| IRI > 2.2 m/km for I and P-Hwy (%) | 15.0 | 14.0 | 12.0 |
| CCI < 60 for S-Hwy (%) | 10.3 | 4.3 | 0.9 |
| Bridges with condition rating ≤4 (%) | 9.2 | 2.1 | 8.7 |

Figure 14:
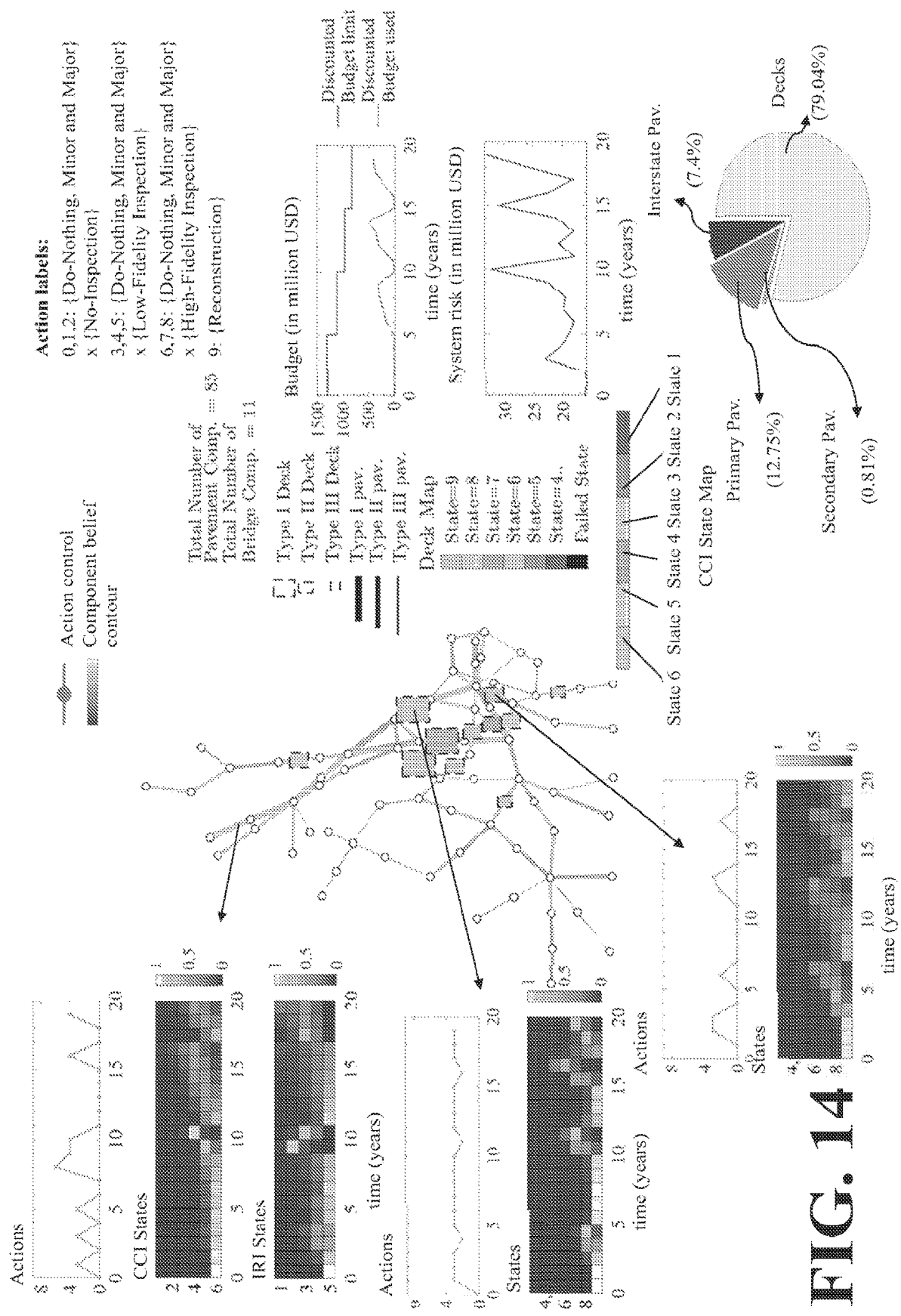
FIG. 14 is an exemplary visual display that can be generated to provide results of a network condition state evolution for inspection and maintenance prioritization with time and scheduling scheme that can be generated by an exemplary embodiment of the proposed DRL framework in conjunction with the communication system and/or computer device that can utilize one or more embodiments of inspection and maintenance prioritization and scheduling process.

To better understand how policies change over time, a detailed policy realization for some representative components is shown in FIG. 14, which illustrates actions generated by one of the instances of the optimum policy and the evolution of component belief states is shown with contours. FIG. 13 is an example of graphics and display elements that can be generated by use of an embodiment of the apparatus to display the graphics and/or display elements of a graphical user interface (GUI) of a display device (e.g., output device 11$o$) to help visualize options for use in selecting and prioritizing maintenance activities.

Additionally, FIG. 14 displays the discounted budget usage over time and the 5-year budget discounted for every cycle. The budget is a deterministic constraint that the agents are not allowed to exceed, a requirement that is satisfied by the obtained solution. The evolution of the total risk cost associated with individual bridges and the 3 modes of system risk is also presented. Moreover, the cost distribution among different types of pavements and bridges is shown in a pie chart.

Plots with control actions can represent the actions taken over time. The maintenance actions, taken at every time step, update the current belief of the system, as manifested in the next time step. The evolution of contour plots in the case of pavements shows current beliefs for both CCI and IRI states, and the current belief states at each step for two bridge decks are also shown. For example, the agent is shown to take action 7 at t=6 years for a type III bridge, and then the updated belief is shown at t=7 years, incorporating both I&M actions.

As seen in FIG. 14, control actions were compatible with belief states. For example, the agents initially choose Do-Nothing actions since the belief states for both pavements and bridges initiate in the intact condition. As the conditions gradually worsen, more interventions are considered. Similarly, at the horizon end, the Do-Nothing action is optimal for pavements, as pavements do not contribute to disconnection risks, while any action without inspection can be optimal for bridges. It has also been observed that the agents maintain and inspect type I bridges more systematically. This is because type I bridges have their individual failure risk as well as mode B and mode C system failure risks associated with them.

From the pie chart, shown in FIG. 14, it can be appreciated that cost distribution is heavily skewed (as much as 75%) towards the bridge components, due to their high maintenance cost, associated risk cost, and lower traffic delay cost, in this example. Among pavements, primary highways have the largest contribution as they represent the most components in the network (47 in total). FIG. 1 also shows the evolution of the system risk with time. As expected, the risk is minimal in the beginning and it increases with time, with downward jumps mainly due to the maintenance actions taken for bridges, especially of type I.

It should therefore be appreciated that embodiments of our process, communication apparatus, communication system 1, and computer device 11 can be adapted to meet a particular set of design criteria. For instance, the particular type of sensors or other hardware can be adjusted to meet a particular set of design criteria. As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain present preferred embodiments of communication apparatus, communication system 1, and computer device 11 as well as embodiments of methods for making and using the same have been shown and described above, it is to be distinctly understood that the invention is not limited thereto but may be otherwise variously embodied and practiced within the scope of the following claims.

What is claimed is:

1. A communication apparatus comprising:
a computer device having a processor connected to a non-transitory computer readable medium, the computer device configured to:
(1) initialize actor neural network weights for a pre-selected number of actors for an episode;
(2) initialize critic neural network weights and Lagrange multipliers for the episode;
(3) determine current beliefs based on asset condition states, model parameters, and pre-defined deterministic constraint metrics;
(4) sample actions from actor neural network outputs or at random and sample an observation from a pre-defined observation probability model for determining a total cost, probabilistic constraints ("probabilistic constraint metrics") and beliefs for a next step of the episode;
(5) repeat (1)-(4) until the episode ends;
(6) sample a batch of experiences based on a current belief, deterministic constraint metrics, actions, costs, and probabilistic constraint metrics, and the beliefs, deterministic constraint metrics, actions, costs, and probabilistic constraint metrics for the next step, at the end of the episode;
(7) calculate an advantage function;
(8) update the actor neural network weights, the critic neural network weights and the Lagrange multipliers for a next episode; and
(9) repeat (3)-(8) until a convergence condition is detected.

2. The communication apparatus of claim 1, wherein the computer device is configured to generate a graphical user interface (GUI) to display at least one graphical element based on data obtained after the convergence condition is detected.

3. The communication apparatus of claim 1, wherein the computer device is a server that is configured to receive sensor data and/or record data from at least one of:
(i) at least one user device communicatively connectable to the computer device;
(ii) at least one sensor; and
(iii) a record storage device communicatively connectable to the computer device.

4. The communication apparatus of claim 3, wherein the computer device is a management device that is communicatively connectable to a user device to generate a graphical user interface (GUI) for display of at least one graphical element at a user device based on data obtained after the convergence condition is detected.

5. The communication apparatus of claim 1, wherein the pre-selected number of actors include decentralized actors with centralized input or decentralized input for the episode.

6. The communication apparatus of claim 1, wherein the advantage function is calculated based on system type, component type, and/or action type.

7. The communication apparatus of claim 1, wherein the computer device is a server that is configured to receive sensor data and/or record data from at least one of:
   (i) at least one user device communicatively connectable to the computer device;
   (ii) at least one sensor; and
   (iii) a record storage device communicatively connectable to the computer device; and
   the communication apparatus includes the record storage device.

8. The communication apparatus of claim 7, comprising the at least one sensor and/or the at least one user device.

9. A process for maintenance prioritization and scheduling comprising:
   (1) initializing actor network weights for a pre-selected number of actors for an episode;
   (2) initializing critic network weights and Lagrange multipliers for the episode;
   (3) determining current beliefs based on asset condition states, model parameters and pre-defined deterministic constraint metrics;
   (4) sampling actions from actor network outputs or at random and sample an observation from a pre-defined observation probability model for determining a total cost, probabilistic constraints ("probabilistic constraint metrics") and beliefs for a next step of the episode based on the determined current beliefs;
   (5) repeating (1)-(4) until the episode ends;
   (6) sampling a batch of experiences based on a current belief, deterministic constraint metrics, actions, costs, and probabilistic constraint metrics, and the beliefs, permanent constraint metrics, actions, costs, and probabilistic constraint metrics for the next step, at the end of the episode;
   (7) calculating an advantage function;
   (8) updating the actor network weights, the critic network weights and the Lagrange multipliers for a next episode; and
   (9) repeating (3)-(8) until a convergence condition is detected.

10. The process of claim 9, comprising:
    generating a graphical user interface (GUI) to display at least one graphical element based on data obtained after the convergence condition is detected.

11. The process of claim 10, comprising:
    receiving sensor data and/or record data from at least one of:
    (i) at least one user device communicatively connectable to a computer device;
    (ii) at least one sensor; and
    (iii) a record storage device communicatively connectable to the computer device.

12. The process of claim 11, wherein the process is performed by a management device that is communicatively connectable to a user device to generate the GUI.

13. The process of claim 9, comprising:
    receiving sensor data and/or record data from at least one of:
    (i) at least one user device communicatively connectable to a computer device;
    (ii) at least one sensor; and
    (iii) a record storage device communicatively connectable to the computer device.

14. The process of claim 9, comprising:
    receiving sensor data and/or record data from (i) at least one user device communicatively connectable to a computer device; (ii) at least one sensor, and (iii) a record storage device communicatively connectable to the computer device.

15. The process of claim 14, comprising:
    generating a graphical user interface (GUI) to display at least one graphical element based on data obtained after the convergence condition is detected.

16. The process of claim 9, wherein the pre-selected number of actors include decentralized actors with centralized input or decentralized input for the episode.

17. The process of claim 9, wherein the advantage function is calculated based on system type, component type, and/or action type.

18. A non-transitory computer readable medium having code stored thereon that defines a method that is performable by a computer device when a processor of the computer device runs the code, the method comprising:
    (1) initializing actor network weights for a pre-selected number of actors for an episode;
    (2) initializing critic network weights and Lagrange multipliers for the episode;
    (3) determining current beliefs based on asset condition states, model parameters and pre-defined deterministic constraint metrics;
    (4) sampling actions from actor network outputs or at random and sample an observation from a pre-defined observation probability model for determining a total cost, probabilistic constraints ("probabilistic constraint metrics") and beliefs for a next step of the episode based on the determined current beliefs;
    (5) repeating (1)-(4) until the episode ends;
    (6) sampling a batch of experiences based on a current belief, deterministic constraint metrics, actions, costs, and probabilistic constraint metrics, and the beliefs, permanent constraint metrics, actions, costs, and probabilistic constraint metrics for the next step, at the end of the episode;
    (7) calculating an advantage function;
    (8) updating the actor network weights, the critic network weights and the Lagrange multipliers for a next episode; and
    (9) repeating (3)-(8) until a convergence condition is detected.

19. The non-transitory computer readable medium of claim 18, wherein the computer device is a management device that is communicatively connectable to a user device to generate a graphical use interface (GUI).

20. The non-transitory computer readable medium of claim 19, wherein the method also comprises
    generating GUI data for display of at least one graphical element in a GUI based on data obtained after the convergence condition is detected.

* * * * *